(12) United States Patent
Westcott et al.

(10) Patent No.: US 12,437,456 B2
(45) Date of Patent: Oct. 7, 2025

(54) DIFFUSION-BASED PERSONALIZED ADVERTISING IMAGE GENERATION

(71) Applicant: IKIN, Inc., Dripping Springs, TX (US)

(72) Inventors: Bryan Lloyd Westcott, Austin, TX (US); Blake Fox, Dripping Springs, TX (US); Christopher Henry Vela, Dripping Springs, TX (US); James Charles Stiefelmaier, Dripping Springs, TX (US); Kristy Tipton, Dripping Springs, TX (US); Richie Romero, Dripping Springs, TX (US); Dusty Coleman, Dripping Springs, TX (US); See Xiong, Dripping Springs, TX (US)

(73) Assignee: IKIN, Inc., Dripping Springs, TX (US)

( * ) Notice: Subject to any disclaimer, the term of this patent is extended or adjusted under 35 U.S.C. 154(b) by 0 days.

(21) Appl. No.: 18/981,120

(22) Filed: Dec. 13, 2024

(65) Prior Publication Data
US 2025/0209700 A1 Jun. 26, 2025

Related U.S. Application Data

(60) Provisional application No. 63/613,658, filed on Dec. 21, 2023.

(51) Int. Cl.
*G06T 11/60* (2006.01)
*G06Q 30/0204* (2023.01)
(Continued)

(52) U.S. Cl.
CPC .......... *G06T 11/60* (2013.01); *G06Q 30/0204* (2013.01); *G06Q 30/0271* (2013.01);
(Continued)

(58) Field of Classification Search
CPC ... G06T 11/60; G06T 5/60; G06T 5/77; G06T 7/11; G06T 2207/20081;
(Continued)

(56) References Cited

U.S. PATENT DOCUMENTS

| 2020/0302686 A1 | 9/2020 | Totty et al. |
| 2021/0074036 A1 | 3/2021 | Fuchs et al. |

(Continued)

OTHER PUBLICATIONS

Co-pending U.S. Appl. No. 18/952,579, inventors Xiong; See et al., filed Nov. 19, 2024.
(Continued)

*Primary Examiner* — Jin Cheng Wang
(74) *Attorney, Agent, or Firm* — Cooley LLP

(57) ABSTRACT

A system has a server to train an artificial intelligence model on training data characterizing a good or service to form a trained model. A client device is associated with a user. The client device executes instructions on a processor to receive the trained model via a network connection to the server, collect user data and obtain a personalized digital image advertisement from the trained model and user data. The personalized digital image advertisement includes a synthetic digital image formed by a trained machine learning model. The personalized digital image advertisement is transformed with fine-grained image control modifications, quality assurance operations, and branding assurance operations to form a final personalized digital image advertisement. The final personalized digital image advertisement is presented on the client device.

20 Claims, 24 Drawing Sheets

(51) Int. Cl.
*G06Q 30/0251* (2023.01)
*G06T 5/60* (2024.01)
*G06T 5/77* (2024.01)
*G06T 7/11* (2017.01)

(52) U.S. Cl.
CPC .................. *G06T 5/60* (2024.01); *G06T 5/77* (2024.01); *G06T 7/11* (2017.01); *G06T 2207/20081* (2013.01); *G06T 2207/20084* (2013.01)

(58) Field of Classification Search
CPC ...... G06T 2207/20084; G06Q 30/0204; G06Q 30/0271
See application file for complete search history.

(56) References Cited

U.S. PATENT DOCUMENTS

| | | | |
|---|---|---|---|
| 2021/0389152 A1* | 12/2021 | Beaurepaire | G01C 21/3635 |
| 2022/0031252 A1 | 2/2022 | Han et al. | |
| 2022/0078271 A1 | 3/2022 | Griffith | |
| 2022/0301252 A1 | 9/2022 | Wang et al. | |
| 2022/0404536 A1 | 12/2022 | Griffith | |
| 2022/0413434 A1 | 12/2022 | Parra Pozo et al. | |
| 2024/0013237 A1* | 1/2024 | Folkens | G06V 10/44 |
| 2024/0046040 A1* | 2/2024 | Tobey | G06Q 30/0271 |
| 2024/0211994 A1* | 6/2024 | Biswas | G06V 20/41 |
| 2024/0355064 A1* | 10/2024 | Skrypnyk | G06T 17/20 |
| 2024/0355065 A1* | 10/2024 | Miller | G06T 19/006 |
| 2024/0378752 A1 | 11/2024 | Westcott et al. | |
| 2024/0378800 A1 | 11/2024 | Westcott et al. | |
| 2024/0378832 A1* | 11/2024 | Joachim | G06T 15/04 |
| 2024/0386634 A1* | 11/2024 | Brown | G06T 11/60 |
| 2024/0394945 A1* | 11/2024 | Orozco | G06V 10/70 |
| 2025/0054226 A1 | 2/2025 | Griffith et al. | |
| 2025/0061548 A1* | 2/2025 | Liu | G06T 5/70 |
| 2025/0078336 A1 | 3/2025 | Westcott et al. | |
| 2025/0088618 A1 | 3/2025 | Westcott et al. | |
| 2025/0097439 A1 | 3/2025 | Westcott et al. | |
| 2025/0117897 A1 | 4/2025 | Westcott et al. | |
| 2025/0124613 A1 | 4/2025 | Westcott et al. | |
| 2025/0133238 A1 | 4/2025 | Westcott et al. | |

OTHER PUBLICATIONS

Co-pending U.S. Appl. No. 18/967,043, inventor Bryan; Lloyd Westcott, filed Dec. 3, 2024.
Co-pending U.S. Appl. No. 18/974,302, inventor Westcott; Bryan Lloyd, filed Dec. 9, 2024.
Haldermann et al. "Exoplanet Characterization using Conditional Invertible Neural Networks." Astronomy & Astrophysics. Apr. 1, 2023; 672:A180, 16 pages.
International Search Report and Written Opinion for PCT/US2024/027839, dated Aug. 22, 2024, 6 pages.
International Search Report and Written Opinion for PCT/US2024/027844, dated Aug. 8, 2024, 6 pages.
Lorensen et al. "A High Resolution 3D Surface Construction Algorithm." Computer Graphics. 1987;21(1):7-12.
Mildenhall et al. "NeRF: Representing Scenes as Neural Radiance Fields for View Synthesis." Communications of the ACM. Dec. 17, 2021;65(1):99-106.
Müller et al. "Instant Neural Graphics Primitives with a Multiresolution Hash Encoding." ACM Transactions on Graphics (TOG). Jul. 22, 2022;41(4), 15 pages.
Sajjadi et al. "Scene Representation Transformer: Geometry-Free Novel View Synthesis Through Set-Latent Scene Representations." In Proceedings of the IEEE/CVF Conference on Computer Vision and Pattern Recognition 2022, pp. 6229-6238.
Sauer et al. "StyleGAN-XL: Scaling StyleGAN to Large Diverse Datasets." In ACM SIGGRAPH 2022 conference proceedings Jul. 27, 2022, Article No. 49, pp. 1-10.
Singh et al. "Polynomial Implicit Neural Representations for Large Diverse Datasets." In Proceedings of the IEEE/CVF Conference on Computer Vision and Pattern Recognition 2023, pp. 2041-2051.
Song et al. "Solving Inverse Problems in Medical Imaging with Score-Based Generative Models." arXiv preprint arXIv:2111.08005 [eess.IV], Jun. 16, 2022, 18 pages.
Zhang et al. "Adding conditional control to text-to-image diffusion models." arXiv preprint arXiv:2302.05543, Nov. 26, 2023; 12 pages.

* cited by examiner

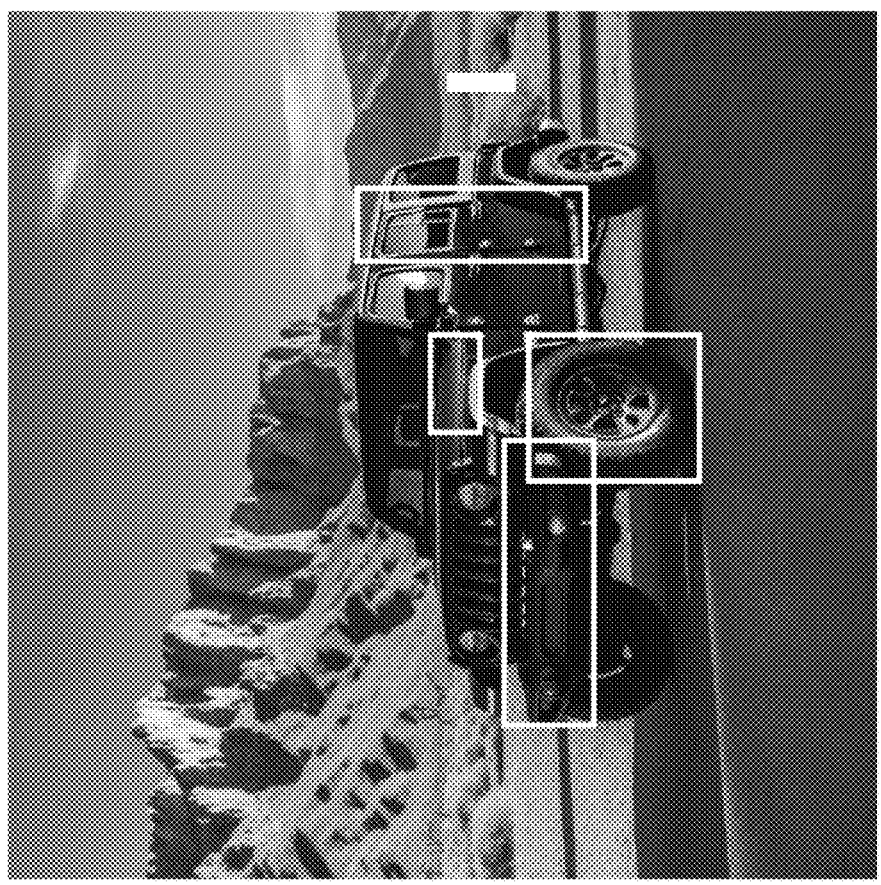
FIG. 14B LoRA Fine Tuning Corrected Brand Features
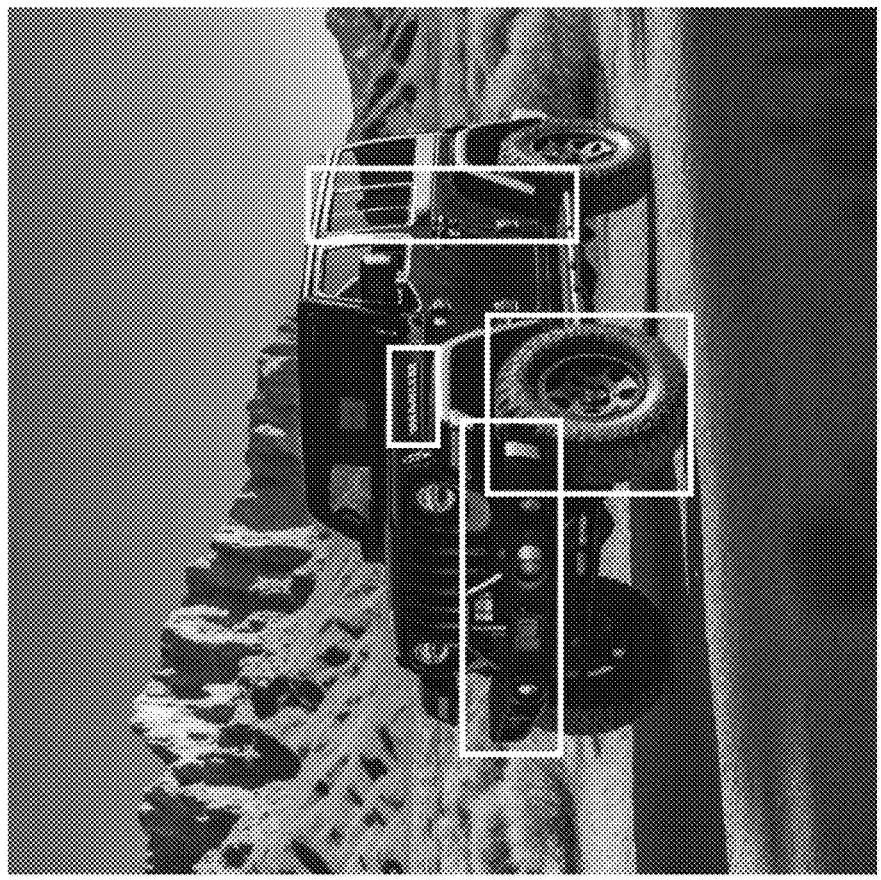
FIG. 14A No Fine Tuning Incorrect Brand Features Guidance + Lora Fine Tuning Image Guidance Added No Fine Tuning Raw FLUX, Snell Variant Fine-Tuned FLUX Image Analysis Reimagined Original Reimagined Score Function Auto-Cropped and ML Upsampled

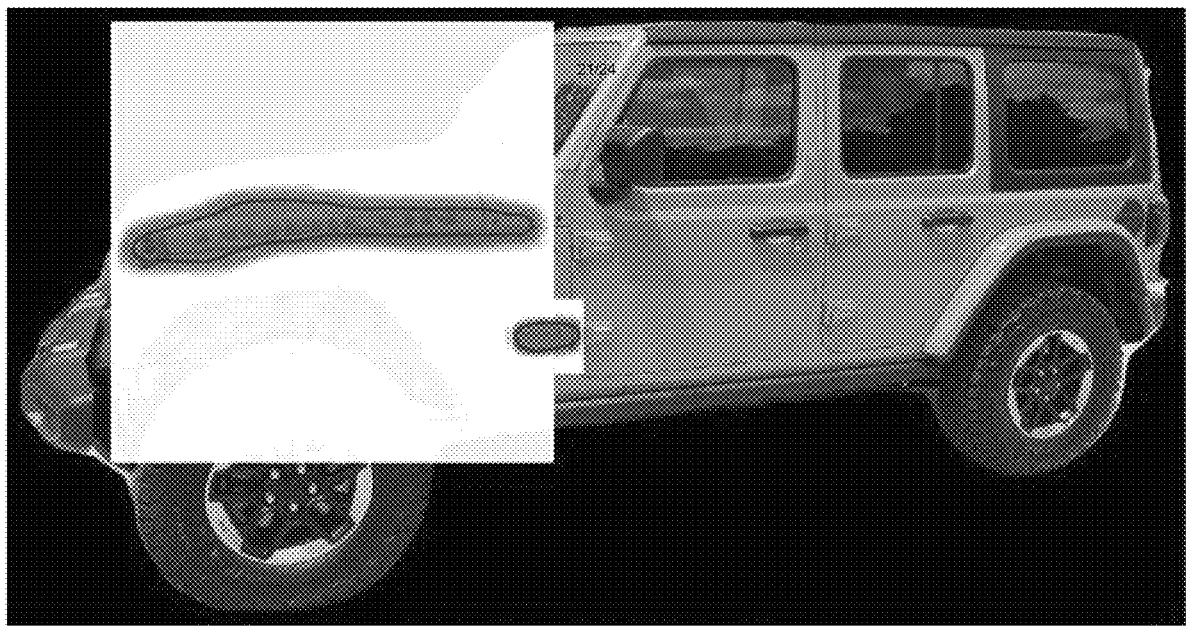
FIG. 21A Branding
Identification and Extraction
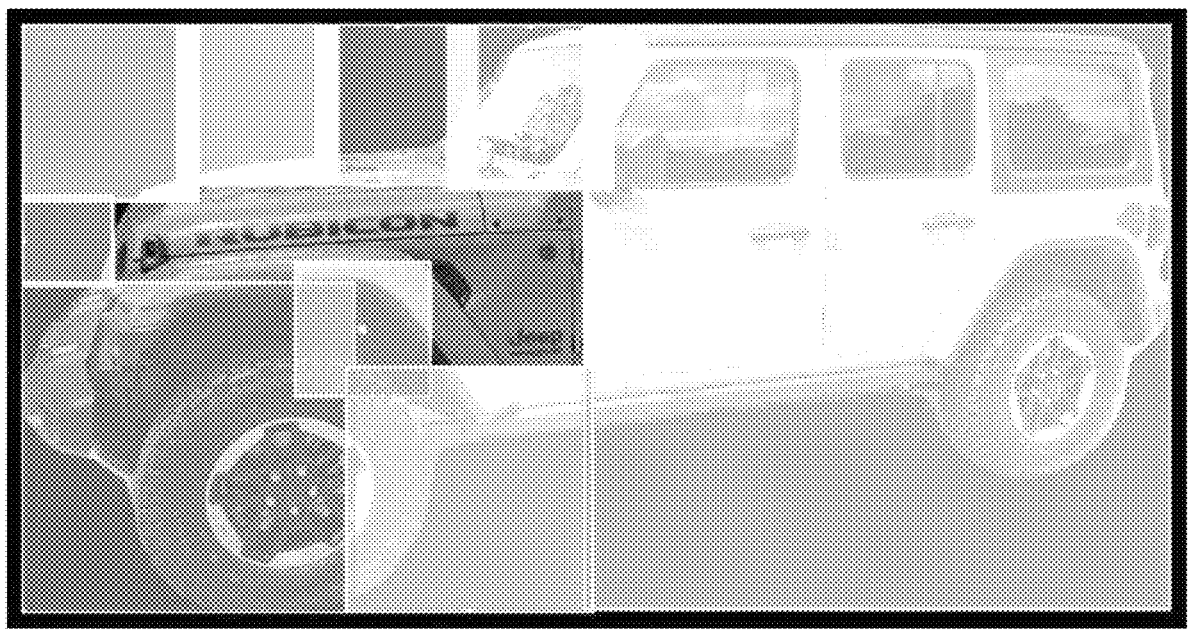
FIG. 21B Non-Branding
Identification and Extraction

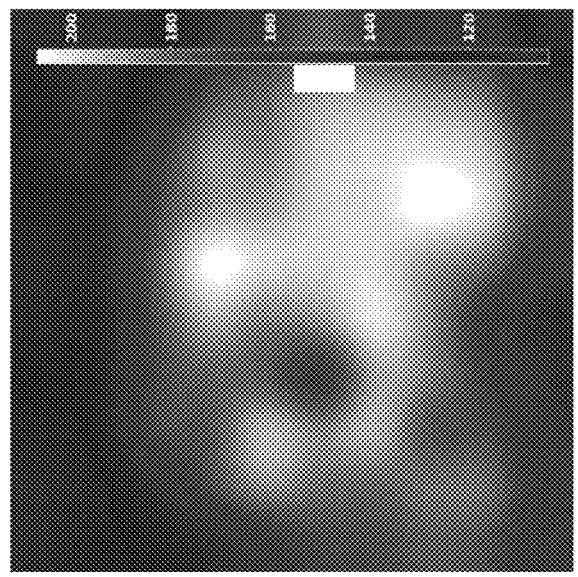
FIG. 22C Perceptual Quality Mask
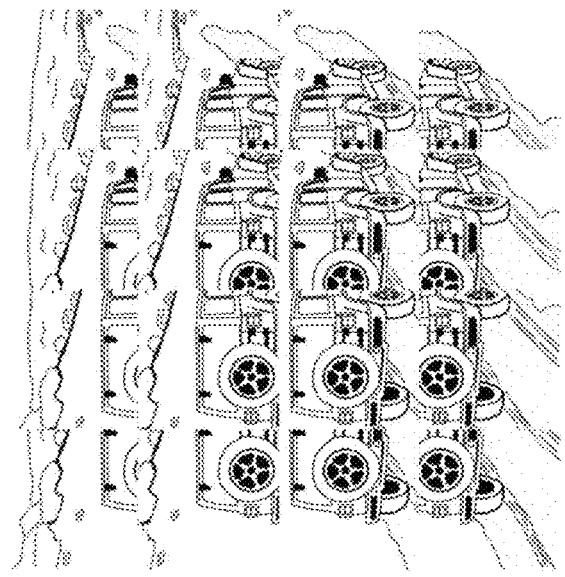
FIG. 22B 4x4 Overlapping Tile Map
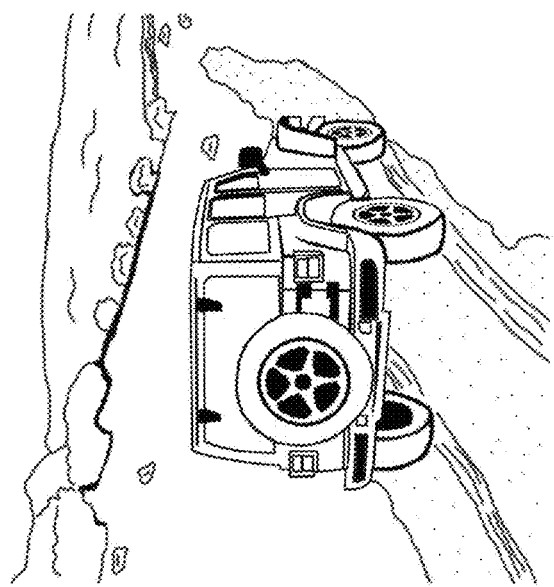
FIG. 22A Generated Image

FIG. 23A Original Generated Image
FIG. 23B Perceptual Quality Assurance Applied

FIG. 24A Generated Image
FIG. 24B Brand Quality Assurance Applied

DIFFUSION-BASED PERSONALIZED ADVERTISING IMAGE GENERATION

CROSS-REFERENCE TO RELATED APPLICATION

This application claims priority to U.S. Provisional Patent Application 63/613,658, filed Dec. 21, 2023, the contents of which are incorporated herein by reference.

FIELD

The present disclosure generally relates to techniques for content customization and, more particularly, to approaches for varying the advertising content for a product or service delivered to different groups of potential customers.

BACKGROUND

Currently, advertising campaigns may create different advertising content for different cohorts (e.g., nationalities). Such campaigns can be expensive and time-consuming to carry out when it is desired to advertise a product or service to many different cohorts. Furthermore, current tracking-based advertising methods are experiencing significant challenges due to the phase-out of third-party cookies at the web browser level alongside a heightened focus on user privacy. These tracking methods, while enhancing advertising efficiency by enabling the creation of detailed user profiles for highly targeted advertising, do so at the expense of user privacy.

Generative AI presents new opportunities to mitigate the need for data tracking/ad matching as content can be created on demand and on device. However, this technology currently lacks the precision required for sufficient quality of product representation and branding (such as trademarks and logos) when used out-of-the-box. Although these unmodified methods have the potential to complement and expedite current advertisement generation processes for marketers and artists, their utility and practicality in addressing the challenges posed by targeted advertising remains unclear.

There is a need for high quality visual advertisements within the trusted compute resources of the consumer (including both trusted opt-in cloud services and the option of limiting or eliminating on device processing for complete privacy preservation). There is also a need for hyper-personalization through hyper-relevant content while ensuring high-quality depictions of products and branding. Such technology would drive increased engagement and conversion, all without relying on any external tracking.

SUMMARY

A system has a server to train an artificial intelligence model on training data characterizing a good or service to form a trained model. A client device is associated with a user. The client device executes instructions on a processor to receive the trained model via a network connection to the server, collect user data and obtain a personalized digital image advertisement from the trained model and user data. The personalized digital image advertisement includes a synthetic digital image formed by a trained machine learning model. The personalized digital image advertisement is transformed with fine-grained image control modifications, quality assurance operations, and branding assurance operations to form a final personalized digital image advertisement. The final personalized digital image advertisement is presented on the client device.

BRIEF DESCRIPTION OF THE DRAWINGS

The invention is more fully appreciated in connection with the following detailed description taken in conjunction with the accompanying drawings, in which:

FIG. 14A shows non-guided inference with no fine tuning, resulting in incorrect brand features.

FIG. 14B shows LoRA-based fine-tuning to ensure correct branded features.

FIG. 16A is a representation of open-source Snell-variant Flux with no fine-tuning.

FIG. 21A shows two branding contours (curved shaded regions) and bounding boxes (square shaded regions).

FIG. 21B provides bounding boxes for non-branding areas, useful for branding or quality assurance to maintain subject information (e.g., with IP adapters).

FIG. 22A illustrates a raw image.

FIG. 22B illustrates the raw image divided into overlapping tiles, shown as a stitched image.

FIG. 22C is a visual of the per-pixel perceptual quality map indicating higher quality with brighter shades.

FIG. 23A is an AI-generated image that is sent into the disclosed pipeline for analysis where visual inconsistencies and artifacts in the landscape are found.

FIG. 23B showcases where the Quality Assurance guidance is applied resolving the inconsistencies found in the original image.

FIG. 24A shows where brand specific text is generated incorrectly and/or with poor quality.

FIG. 24B showcases the result post the automatic and dynamically identified, masked, cropped, and correctly reapplied content.

Like reference numerals refer to corresponding parts throughout the several views of the drawings.

DETAILED DESCRIPTION

Introduction

Figure 1:
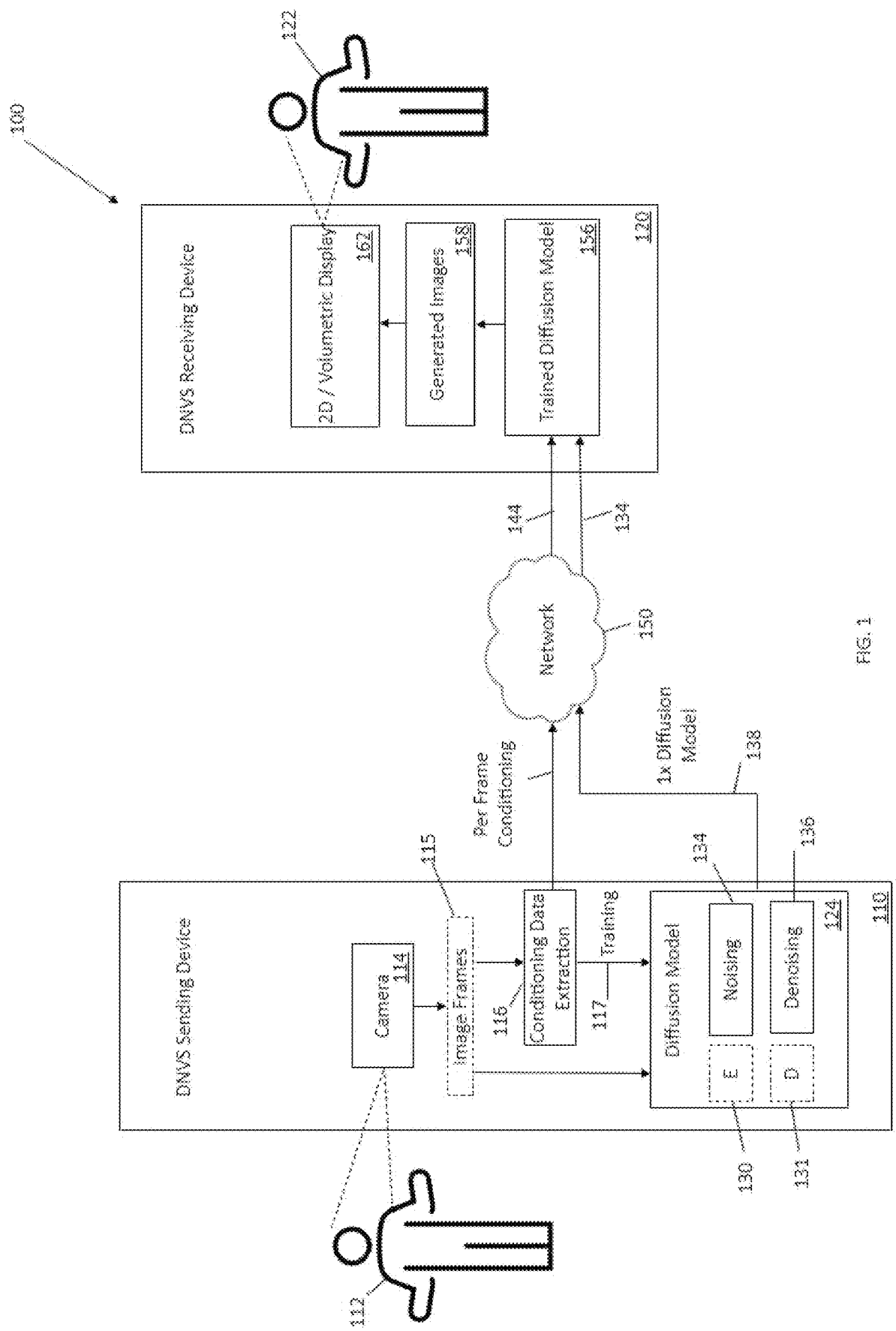
FIG. 1 illustrates a diffusion-based novel view synthesis (DNVS) communication system in accordance with an embodiment.

Conditional Diffusion for Video Communication and Streaming

In one aspect the disclosure relates to a conditional diffusion process capable of being applied in video communication and streaming of pre-existing media content. As an initial matter consider that the process of conditional diffusion may be characterized by Bayes' theorem:

$$p(x \mid y) = p(y \mid x) * p(x)/p(y)$$

One of the many challenges of practical use of Bayes' theorem is that it is intractable to compute $p(y)$. One key to utilizing diffusion is to use score matching (log of the likelihood) to make $p(y)$ go away in the loss function (the criteria used by the machine-learning (ML) model training algorithm to determine what a "good" model is). This yields:

$$E\_p(x)\log[p(x \mid y)] = E\_p(x)\log[p(y \mid x)p(x)/p(y)] =$$
$$E\_p(x)[\log(p(y \mid x)) + \log(p(x) - \log(p(y))] =$$
$$E\_p(x)[\log(p(y \mid x)) + \log(p(x)]$$

Since $p(x)$ remains unknown an unconditional diffusion model is used, along with a conditional diffusion model for $p(y|x)$. One principal benefit of this approach is that it is learned how to invert a process ($p(y|x)$) but balance that progress with the prior ($p(x)$), which enables learning from experience and provides improved realism (or improved adherence to a desired style). The use of the high-quality diffusion models will allow low-bandwidth, sparse representations (y) to be improved.

To use this approach in video communication or a 3D-aware/holographic chat session, the relevant variables in this context may be characterized as follows:

x is image(s) of a specific face in a lot of different expressions and a lot of different poses gives you the unconditional diffusion model $q(x)$ that approximates $p(x)$ y is the 3D face mesh coordinates (e.g., MediaPipe, optionally to include body pose coordinates and even eye gaze coordinates), in the most basic form but may also include additional dimensions (e.g., RGB values at those coordinates)

We simply use MediaPipe to produce y from x and thus we can train the conditional diffusion model $q(y|x)$ that estimates $p(y|x)$ using diffusion.

Then we have everything we need to optimize the estimate of $p(x|y)$.

How would this approach work in a holographic chat or 3D aware communication context? In the case of holographic chat, one key insight is that the facial expressions and head/body pose relative to the captured images can vary. This means that a receiver with access to $q(y|x)$ can query a new pose by moving those rigid 3D coordinates (y) around in 3D space to simulate parallax. This has two primary benefits:

1. they are sparse and thus require less bandwidth
2. They can be rotated purely at the receiver thus providing parallax for holographic video A holographic chat system would begin by training a diffusion model (either from scratch or as a customization as is done with LoRA) on a corpus of selected images (x), and face mesh coordinates (y) derived from the images, for the end user desiring to transmit their likeness. Those images may be in a particular style: e.g., in business attire, with combed hair, make-up, etc. After that model $q(y|x)$ is transmitted, you can then then transmit per-frame face mesh coordinates, and then we simply use head-tracking to query the view we need to provide parallax. The key is an unconditional noise process model $q(y|x)$ is sent from a transmitter to a receiver once. After the unconditional noise process has been sent, the transmitter just sends per-frame face mesh coordinates (y).

Set forth below are various possible some extensions made possible by this approach:

Additional dimensions of information could be provided with each face mesh point, for example RGB values, which gives some additional information on the extrinsic illumination.

Body pose coordinates could be added and altered independently of the face/eyes, allowing the gaze direction of the user to be synthetically altered. When combined with knowledge of the viewer's location and monitor information, this could provide virtual eye contact that is not possible with current webchat as a camera would need to be positioned in the middle of the monitor.

Any other additional low-bandwidth/sparse information (discussed in compression section) could be added, including background information. The relative poses of the user and the background could be assisted with embedded or invisible (to the human eye) fiducial markers such as ArUco markers.

If we track the gaze of the receiving user, we could selectively render/upsample the output based on the location being at any given moment, which saves rendering computation.

For more general and non-3D-aware applications (e.g., for monocular video) the transmitter could use several sparse representations for transmitted data (y) including:

canny edge locations, optionally augmented with RGB and/or depth (from a library such as DPT)

features used for computer vision (e.g., DINO, SIFT)

a low-bandwidth (low-pass-filtered) and down sampled version of the input.

AI feature correspondences: transmit the feature correspondence locations and ensure the conditional diffusion reconstructs those points to correspond correctly in adjacent video frames.

Note: this is different from the TokenFlow video diffusion approach as it enforces the correspondences on the generative/stylized output This process may be utilized in a codec configured to, for example, compress a and transmit new or existing video content. In this case the transmitter would train q(x) on a whole video, a whole series of episodes, a particular director, or an entire catalog. Note that such training need not be on the entirety of the diffusion model but could involve training only select layers using, for example, a low-rank adapter such as LoRA. This model (or just the low-rand adapter) would be transmitted to the receiver. Subsequently, the low-rank/low-bandwidth information would be transmitted, and the conditional diffusion process would reconstruct the original image. In this case the diffusion model would learn the decoder, but the prior (q(x)) keeps it grounded and should reduce the uncanny valley effect.

Exemplary Embodiments for Diffusion-Based Video Communications and Streaming

FIG. 1 illustrates a diffusion-based novel view synthesis (DNVS) communication system 100 in accordance with an embodiment. The system 100 includes a DNVS sending device 110 associated with a first user 112 and a DNVS receiving device 120 associated with a second user 122. During operation of the system 100 a camera 114 within the DNVS sending device 110 captures images 115 of an object or a static or dynamic scene. For example, the camera 114 may record a video including a sequence of image frames 115 of the object or scene. The first user 112 may or may not be appear within the image frames 115.

As shown, the DNVS sending device 110 includes a diffusion model 124 that is conditionally trained during a training phase. In one embodiment the diffusion model 124 is conditionally trained using image frames 115 captured prior to or during the training phase and conditioning data 117 derived from the training image frames by a conditioning data extraction module 116. The conditioning data extraction module 116 may be implemented using a solution such as, for example, MediaPipe Face Mesh, configured to generate 3D face landmarks from the image frames. However, in other embodiments the conditioning data 117 may include other data derived from the training image frames 115 such as, for example, compressed versions of the image frames, or edge detector output (e.g., canny edges) derived from the image frames 115.

The diffusion model 124 may include an encoder 130, a decoder 131, a noising structure 134, and a denoising network 136. The encoder 130 may be a latent encoder and the decoder 131 may be a latent decoder 131. During training the noising structure 134 adds noise to the training image frames in a controlled manner based upon a predefined noise schedule. The denoising network 134, which may be implemented using a U-Net architecture, is primarily used to perform a "denoising" process during the training process pursuant to which noisy images corresponding to each step of the diffusion process are progressively refined to generate high-quality reconstructions of the training images 115.

Figure 2:
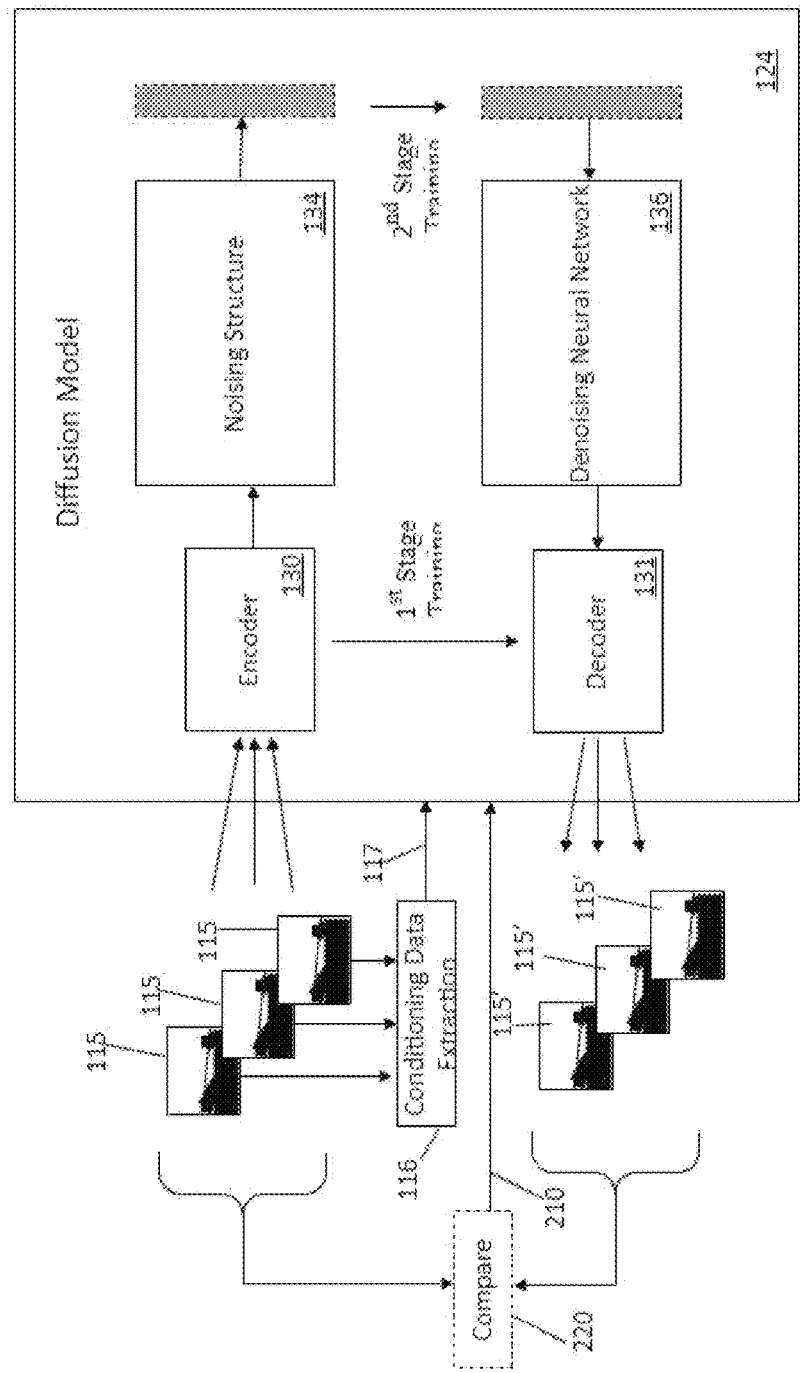
FIG. 2 illustrates a process for conditionally training a diffusion model for use in diffusion-based communication in accordance with the disclosure.

Reference is now made to FIG. 2, which illustrates a process 200 for conditionally training a diffusion model for use in diffusion-based communication in accordance with the disclosure. In one embodiment the encoder 130 and the decoder 131 of the diffusion model, which may be a generative model such as a version of Stable Diffusion, are initially trained using solely the training image frames 115 to learn a latent space associated with the training image frames 115. Specifically, the encoder 130 maps image frames 115 to a latent space and the decoder 131 generates reconstructed images 115' from samples in that latent space. The encoder 130 and decoder 131 may be adjusted 210 during training to minimize differences identified by comparing 220 the reconstructed imagery 115' generated by the decoder 131 and the training image frames 115.

After first stage training of the encoder 130 and decoder 131, the combined diffusion model 124 (encoder 130, decoder 131, and diffusion stages 134, 136) may then be trained during a second stage using the image frames 115 acquired for training. During this training phase the model 124 is guided 210 to generate reconstructed images 115' through the diffusion process that resemble the image frames 115. Depending on the specific implementation of the diffusion model 124, the conditioning data 117 derived from the image frames 115 during training can be applied at various stages of the diffusion process to guide the generation of reconstructed images. For example, the conditioning data 117 could be applied only to the noising structure 134, only to the denoising network 136, or to both the noising structure 134 and the denoising network 136.

In some embodiments the diffusion model 124 may have been previously trained using image other than the training image frames 115. In such cases it may be sufficient to perform only the first stage training pursuant to which the encoder 130 and decoder 131 are trained to learn the latent space associated with the training image frames. That is, it may be unnecessary to perform the second stage training involving the entire diffusion model 124 (i.e., the encoder 130, decoder 131, noising structure 134, denoising network 136).

Referring again to FIG. 1, once training of the diffusion model 124 based upon the image frames 115 has been completed, model parameters 138 applicable to the trained diffusion model 124 are sent by the latent DNVS sending device 110 over a network 150 to the DNVS receiving device 120. The model parameters 138 (e.g., encoder/decoder parameters and neural network weights) are applied to a corresponding diffusion model architecture on the DNVS receiving device 120 to instantiate a trained diffusion model 156 corresponding to a replica of the trained diffusion model 124. In embodiments in which only the encoder 130 and decoder 131 are trained (i.e., only the first stage training is performed), the model parameters 138 will be limited to parameter settings applicable to the encoder 130 and decoder 131 and can thus be communicated using substantially less data.

Once the diffusion model 124 has been trained and its counterpart trained model 156 established on the DNVS receiving device 120, generated images 158 corresponding to reconstructed versions of new image frames acquired by the camera 114 of the DNVS sending device 120 may be generated by the DNVS receiving device 120 as follows. Upon a new image frame 115 becoming captured by the camera 114, the conditioning data extraction module 116 extracts conditioning data 144 from the new image frame 115 and transmits the conditioning data 144 to the DNVS receiving device. The conditioning data 144 is provided to the trained diffusion model 156, which produces a generated image 158 corresponding to the new image 115 captured by the camera 114. The generated image 158 may then be displayed by a conventional 2D display or a volumetric display. It may be appreciated that because the new image 115 of a subject captured by the camera 114 will generally differ from training images 115 of the subject previously captured by the camera 114, the generated images 158 will generally correspond to "novel views" of the subject in that the trained diffusion model 156 will generally have been trained on the basis of training images 115 of the subject different from such novel views.

The operation of the system 100 may be further appreciated considering the preceding discussion of the underpinnings of conditional diffusion for video communication and streaming in accordance with the disclosure. In the context of the preceding discussion, the parameter x corresponds to training image frame(s) 115 of a specific face in a lot of different expressions and a lot of different poses. This yields the unconditional diffusion model q(x) that approximates p(x). The parameter y corresponds to the 3D face mesh coordinates produced by the conditioning data extraction module 116 (e.g., MediaPipe, optionally to include body pose coordinates and even eye gaze coordinates), in the most basic form but may also include additional dimensions (e.g., RGB values at those coordinates). During training the conditioning data extraction module 116 produces y from x and thus we can train the conditional diffusion model q(y|x) that estimates p(y|x) using diffusion. Thus, we have everything we need to optimize the estimate of p(x|y) for use following training; that is, to optimize a desired fit or correspondence between conditioning data 144 (y) and a generated image 158 (x).

It may be appreciated that the conditioning data 144 (y) corresponding to an image frame 115 will typically be of substantially smaller size than the image frame 115. Accordingly, the receiving device 120 need not receive new image frames 115 to produce generated images 158 corresponding to such frames but need only receive the conditioning data 120 derived from the new frames 115. Because such conditioning data 144 is so much smaller in size than the captured image frames 115, the DNVS receiving device can reconstruct the image frames 115 as generated images 158 while receiving only a fraction of the data included within each new image frame produced by the camera 114. This is believed to represent an entirely new way of enabling reconstruction of versions of a sequence of image frames (e.g., video) comprised of relatively large amounts of image data from much smaller amounts of conditioning data received over a communication channel.

Figure 3:
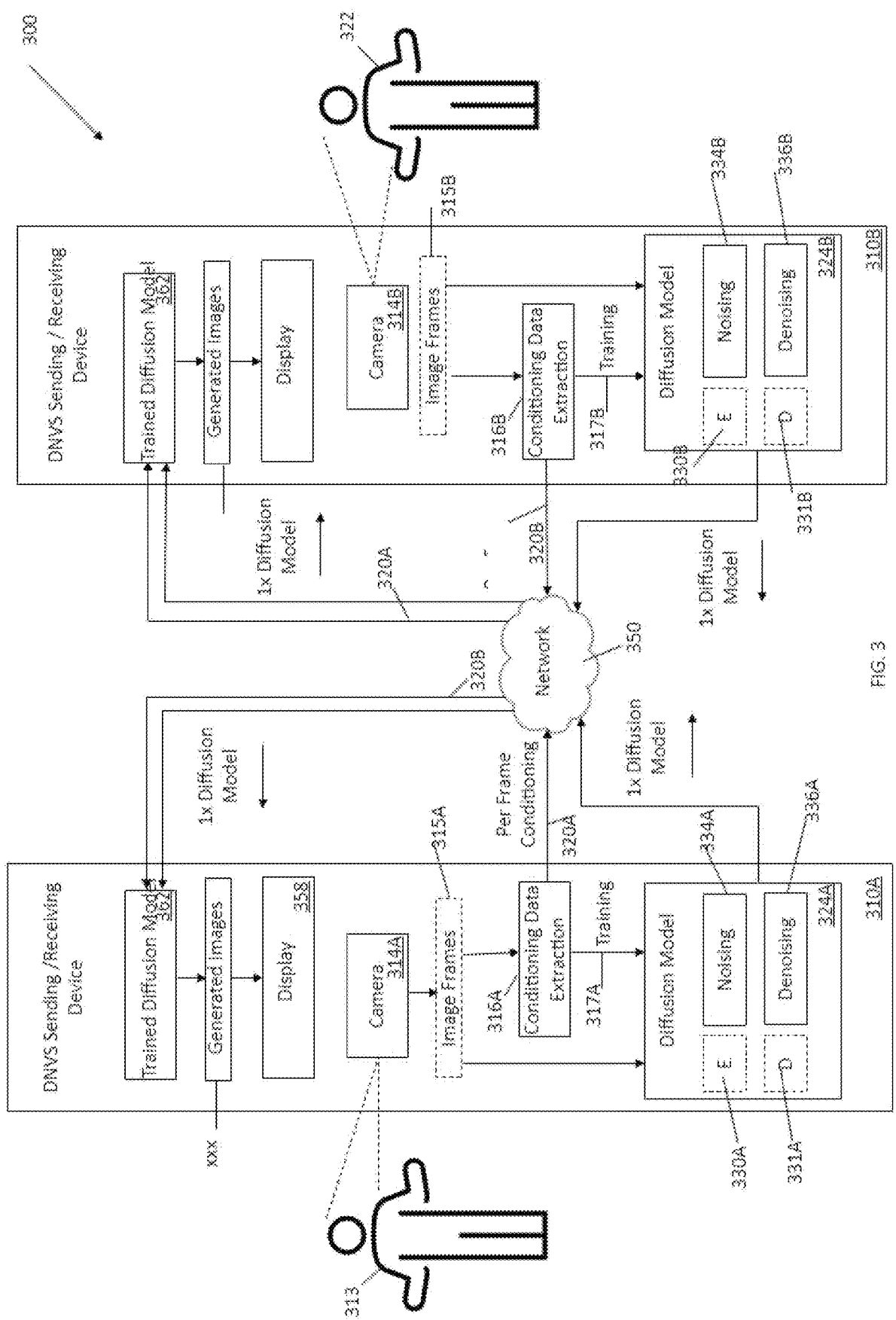
FIG. 3 illustrates another diffusion-based novel view synthesis (DNVS) communication system in accordance with an embodiment.

FIG. 3 illustrates another diffusion-based novel view synthesis (DNVS) communication system 300 in accordance with an embodiment. As may be appreciated by comparing FIGS. 1 and 3, the communication system 300 is substantially like the communication system 100 of FIG. 1 with the exception that a first user 312 is associated with a first DNVS sending/receiving device 310A and the second user 322 is associated with a second DNVS sending receiving device 310B. In the embodiment of FIG. 3 both the first DNVS sending/receiving device 310A and the second DNVS sending/receiving device 310B can generate conditionally trained diffusion models 324 representative of an object or scene using training image frames 315 and conditioning data 317 derived from the training image frames 315. Once the diffusion models 324 on each device 310 are trained, weights defining the conditionally trained models 324 are sent (preferably one time) to the other device 310. Each device 310A, 310B may then reconstruct novel views of the object or scene modeled by the trained diffusion model 324 which it has received from the other device 310A, 310B in response to conditioning data 320A, 320B received from such other devices. For example, the first user 312 and the second user 322 could use their respective DNVS sending/receiving devices 310A, 310B to engage in a communication session during which each user 312, 322 could, preferably in real time, engage in video communication with the other user 312, 322. That is, each user 312, 322 could view a reconstruction of a scene captured the camera 314A, 314B of the other user based upon conditioning data 320A, 320B derived from an image frame 315A, 315B representing the captured scene, preferably in real time.

Figure 4:
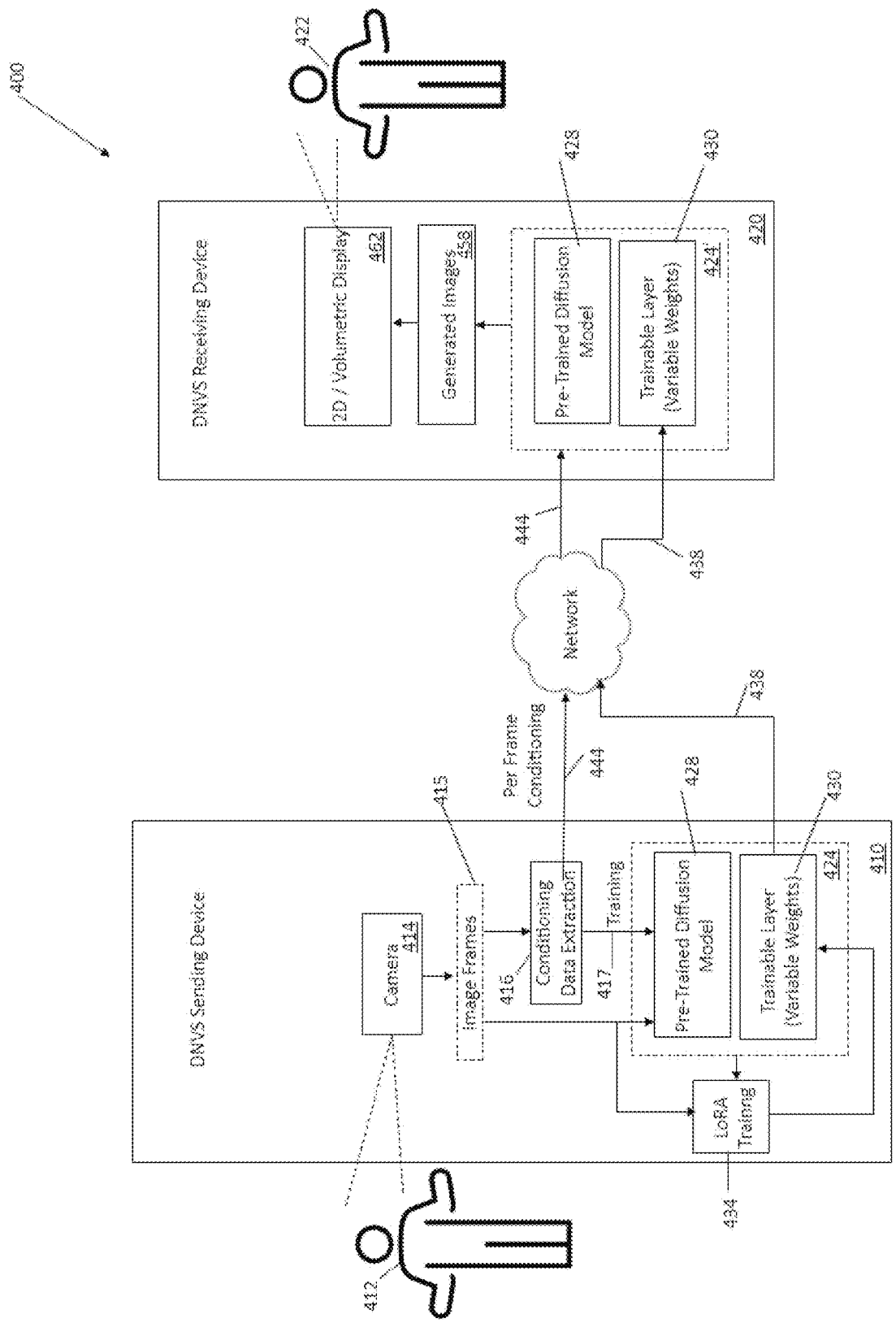
FIG. 4 illustrates an alternative diffusion-based novel view synthesis (DNVS) communication system in accordance with an embodiment.

Attention is now directed to FIG. 4, which illustrates an alternative diffusion-based novel view synthesis (DNVS) communication system 400 in accordance with an embodiment. The system 400 includes a DNVS sending device 410 associated with a first user 412 and a DNVS receiving device 420 associated with a second user 422. During operation of the system 400 a camera 414 within the DNVS sending device 410 captures images 415 of an object or a static or dynamic scene. For example, the camera 414 may record a video including a sequence of image frames 415 of the object or scene. The first user 412 may or may not appear within the image frames 145.

As shown, the DNVS sending device 110 includes a diffusion model 424 consisting of a pre-trained diffusion model 428 and trainable layer 430 of the pre-trained diffusion model 428. In one embodiment the pre-trained diffusion model 428 may be a widely available diffusion model (e.g., Stable Diffusion or the like) that is pre-trained without the benefit of captured image frames 415. During a training phase the diffusion model 424 is conditionally trained through a low-rank adaptation (LoRA) process 434 pursuant to which weights within the trainable layer 430 are adjusted while weights of the pre-trained diffusion model 428 are held fixed. The trainable layer 430 may, for example, comprise a cross-attention layer associated with the pre-trained diffusion model 428; that is, the weights in such cross-attention layer may be adjusted during the training process while the remaining weights throughout the remainder of the pre-trained diffusion model 428 are held constant.

The diffusion model 424 is conditionally trained using image frames 415 captured prior to or during the training phase and conditioning data 417 derived from the training image frames by a conditioning data extraction module 416. Again, the conditioning data extraction module 416 may be implemented using a solution such as, for example, MediaPipe Face Mesh, configured to generate 3D face landmarks from the image frames. However, in other embodiment the conditioning data 417 may include other data derived from the training image frames 415 such as, for example, compressed versions of the image frames, or edge detector output (e.g., canny edges) derived from the image frames 115.

When training the diffusion model 424 with the training image frames 415 and the conditioning data 417 only model weights 438 within the trainable layer 430 of the diffusion model 424 are adjusted. That is, rather than adjusting weights through the model 424 in the manner described with reference to FIG. 1, training of the model 424 is confined to adjusting weights 438 within the trainable layer 430. This advantageously results in dramatically less data being conveyed from the DNVS sending device 410 to the DNVS receiving device 420 to establish a diffusion model 424' on the receiver 420 corresponding to the diffusion model 424. This is because only the weights 438 associated with the trainable layer 430, and not the known weights of the pre-trained diffusion model 428, are communicated to the receiver 420 at the conclusion of the training process.

Once the diffusion model 424 has been trained and its counterpart trained model 424' established on the DNVS receiving device 420, generated images 458 corresponding to reconstructed versions of new image frames acquired by the camera 414 of the DNVS sending device 410 may be generated by the DNVS receiving device 420 as follows. Upon a new image frame 415 becoming captured by the camera 414, the conditioning data extraction module 416 extracts conditioning data 444 from the new image frame 415 and transmits the conditioning data 444 to the DNVS receiving device. The conditioning data 444 is provided to the trained diffusion model 424', which produces a generated image 458 corresponding to the new image 415 captured by the camera 414. The generated image 458 may then be displayed by a conventional 2D display or a volumetric display 462. It may be appreciated that because the new image 415 of a subject captured by the camera 414 will generally differ from training images 415 of the subject previously captured by the camera 414, the generated images 458 will generally correspond to "novel views" of the subject in that the trained diffusion model 424' will generally have been trained on the basis of training images 415 of the subject different from such novel views.

Moreover, although the trained diffusion model 424' may be configured to render generated images 458 which are essentially indistinguishable to a human observer from the image frames 415, the pre-trained diffusion model 428 may also have been previously trained to introduce desired effects or stylization into the generated images 458. For example, the trained diffusion model 424' (by virtue of certain pre-training of the pre-trained diffusion model 428) may be prompted to adjusting the scene lighting (e.g., lighten or darken) within the generated images 458 relative to the image frames 415 corresponding to such images 458. As another example, when the image frames 415 include human faces and the pre-trained diffusion model 428 has been previously trained to be capable of modifying human faces, the diffusion model 424' may be prompted to change the appearance of human faces with within the generated images 458 (e.g., change skin tone, remove wrinkles or blemishes or otherwise enhance cosmetic appearance) relative to their appearance within the image frames 415. Accordingly, while in some embodiments the diffusion model 424' may be configured such that the generated images 458 faithfully reproduce the image content within the image frames 415, in other embodiments the generated images 458 may introduce various desired image effects or enhancements.

Figure 5:
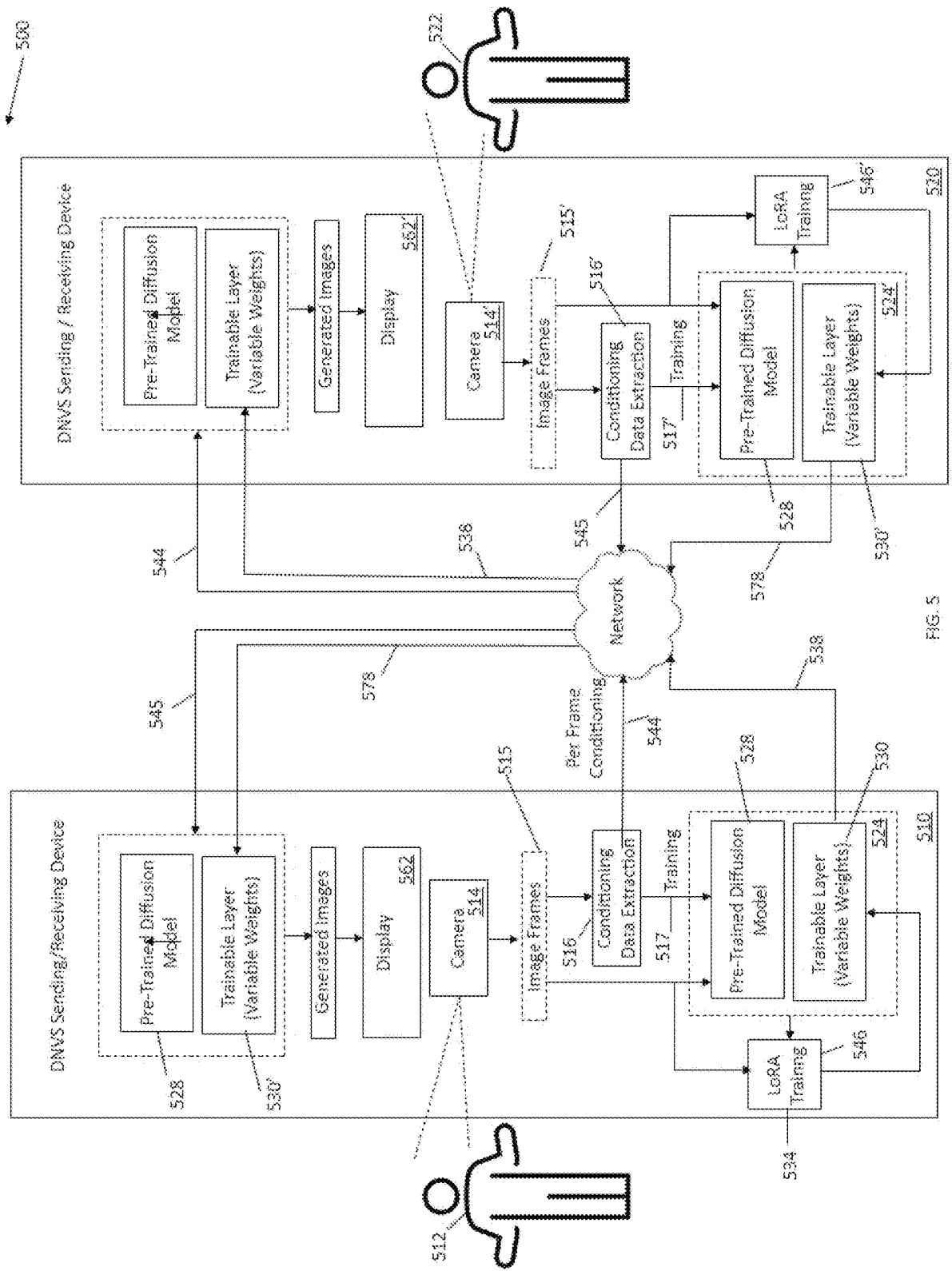
FIG. 5 illustrates another diffusion-based novel view synthesis (DNVS) communication system in accordance with an embodiment.

FIG. 5 illustrates another diffusion-based novel view synthesis (DNVS) communication system 500 in accordance with an embodiment. As may be appreciated by comparing FIGS. 4 and 5, the communication system 500 is substantially similar to the communication system 400 of FIG. 4 with the exception that a first user 512 is associated with a first DNVS sending/receiving device 510 and a second user 522 is associated with a second DNVS sending receiving device 520. In the embodiment of FIG. 5 both the first DNVS sending/receiving device 510 and the second DNVS sending/receiving device 520 can generate conditionally training diffusion models 524, 524' representative of an object or scene using training image frames 515 and conditioning data 517 derived from the training image frames 515. Once the diffusion models 524 on each device 510, 520 are trained, weights 538, 578 for the trainable layers 530, 530' of the conditionally trained models 524, 524' are sent to the other device 510, 520. Updates to the weights 538, 578 may optionally be sent following additional LoRA-based training using additional training image frames 515, 515'. Each device 510, 520 may then reconstruct novel views of the object or scene modeled by the trained diffusion model 524, 524' which it has received from the other device 510, 520 in response to conditioning data 544, 545 received from such other device. For example, the first user 512 and the second user 522 could use their respective DNVS sending/receiving devices 510, 520 to engage in a communication session during which each user 512, 522 could, preferably in real time, engage in video communication with the other user 512, 522. That is, each user 512, 522 could view a reconstruction of a scene captured the camera 514, 514' of the other user based upon conditioning data 544, 545 derived from an image frame 515, 515' representing the captured scene, preferably in real time.

Figure 6:
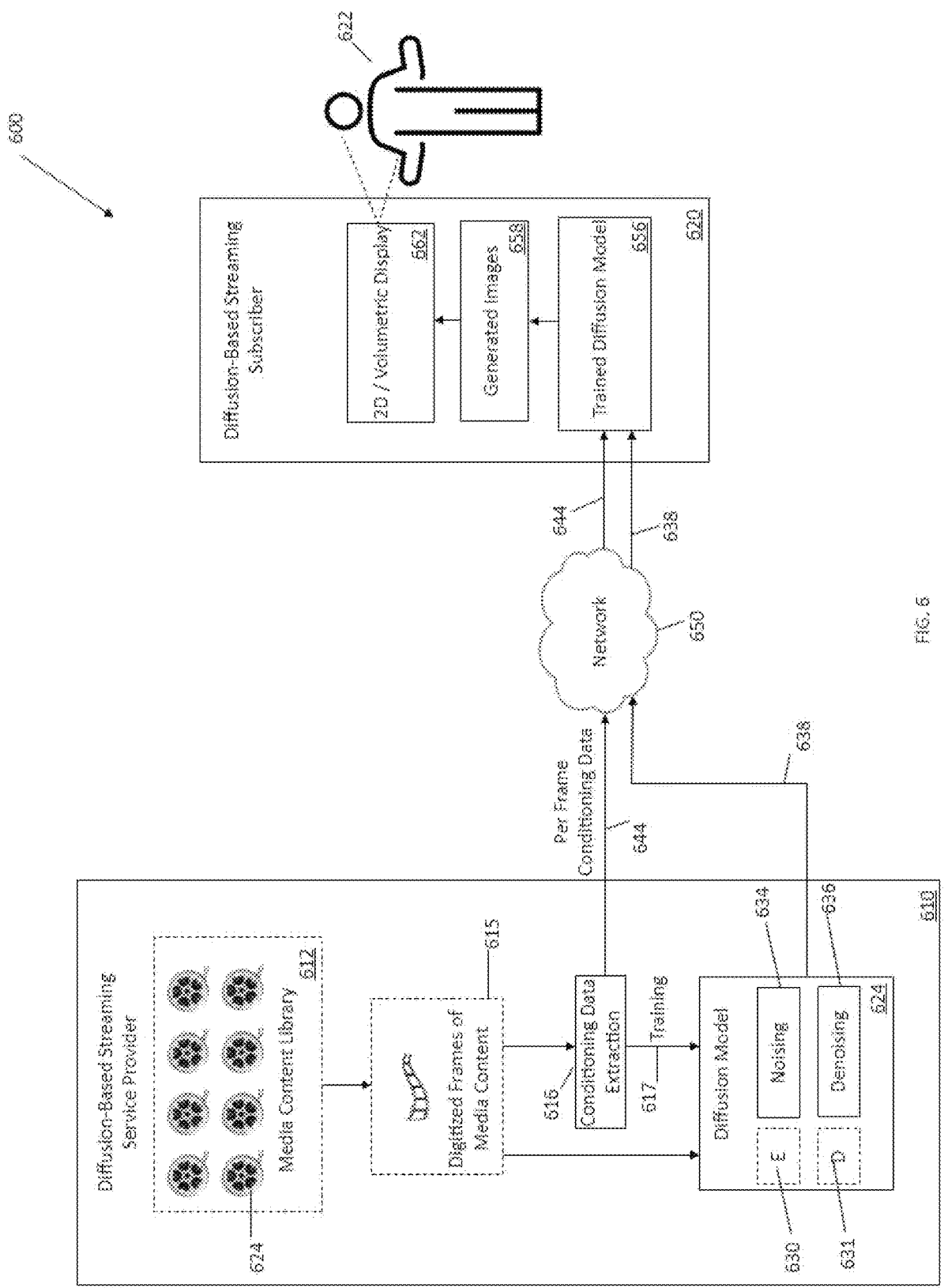
FIG. 6 illustrates a diffusion-based video streaming and compression system in accordance with an embodiment.

FIG. 6 illustrates a diffusion-based video streaming and compression system 600 in accordance with an embodiment. The system 600 includes a diffusion-based streaming service provider facility 610 configured to efficiently convey media content from a media content library 612 to diffusion-based streaming subscriber device 620. As shown, the diffusion-based streaming service provider facility 610 includes a diffusion model 624 that is conditionally trained during a training phase. In one embodiment the diffusion model 624 is conditionally trained using (i) digitized frames of media content 615 from one or more media files 624 (e.g., video files) included within the content library 612 and (ii) conditioning data 617 derived from image frames within the media content by a conditioning data extraction module 616. The conditioning data extraction module 616 may be configured to, for example, generate compressed versions of the image frames within the media content, derive edge detector output from the image frames, or otherwise derive representations of such image frames containing substantially less data than the image frames themselves.

The diffusion model 624 may include an encoder 630, a decoder 631, a noising structure 634, and a denoising network 636. The encoder 630 may be a latent encoder and the decoder 631 may be a latent decoder 631. The diffusion model 624 may be trained in substantially the same manner as was described above with reference to training of the diffusion model 124 (FIGS. 1 and 2); provided, however, that in the embodiment of FIG. 6 the training information is comprised of the digitized frames of media content 615 (e.g., all of the video frames in a movie or other video content) and the conditioning data 617 associated with each digitized frame 615.

Referring again to FIG. 6, once training of the diffusion model 624 based upon the digitized frames of media content 615 has been completed, model parameters 638 applicable to the trained diffusion model 624 are sent by the streaming service provider facility 610 over a network 650 to the streaming subscriber device 620. The model parameters 638 (e.g., encoder/decoder parameters) are applied to a corresponding diffusion model architecture on the streaming subscriber device 620 to instantiate a trained diffusion model 656 corresponding to a replica of the trained diffusion model 624.

Once the diffusion model 624 has been trained and its counterpart trained model 656 established on the streaming subscriber device 620, generated images 658 corresponding to reconstructed versions of digitized frames of media content may be generated by the streaming subscriber device 620 as follows. For each digitized media content frame 615, the conditioning data extraction module 616 extracts conditioning data 644 from the media content frame 615 and transmits the conditioning data 644 to the streaming subscriber device 620. The conditioning data 644 is provided to the trained diffusion model 656, which produces a generated image 658 corresponding to the media content frame 615. The generated image 658 may then be displayed by a conventional 2D display or a volumetric display. It may be appreciated that because the amount of conditioning data 644 generated for each content frame 615 is substantially less than the amount of image data within each content frame 615, a high degree of compression in obtained by rendering images 658 corresponding to reconstructed versions of the content frames 615 in this manner.

Figure 7:
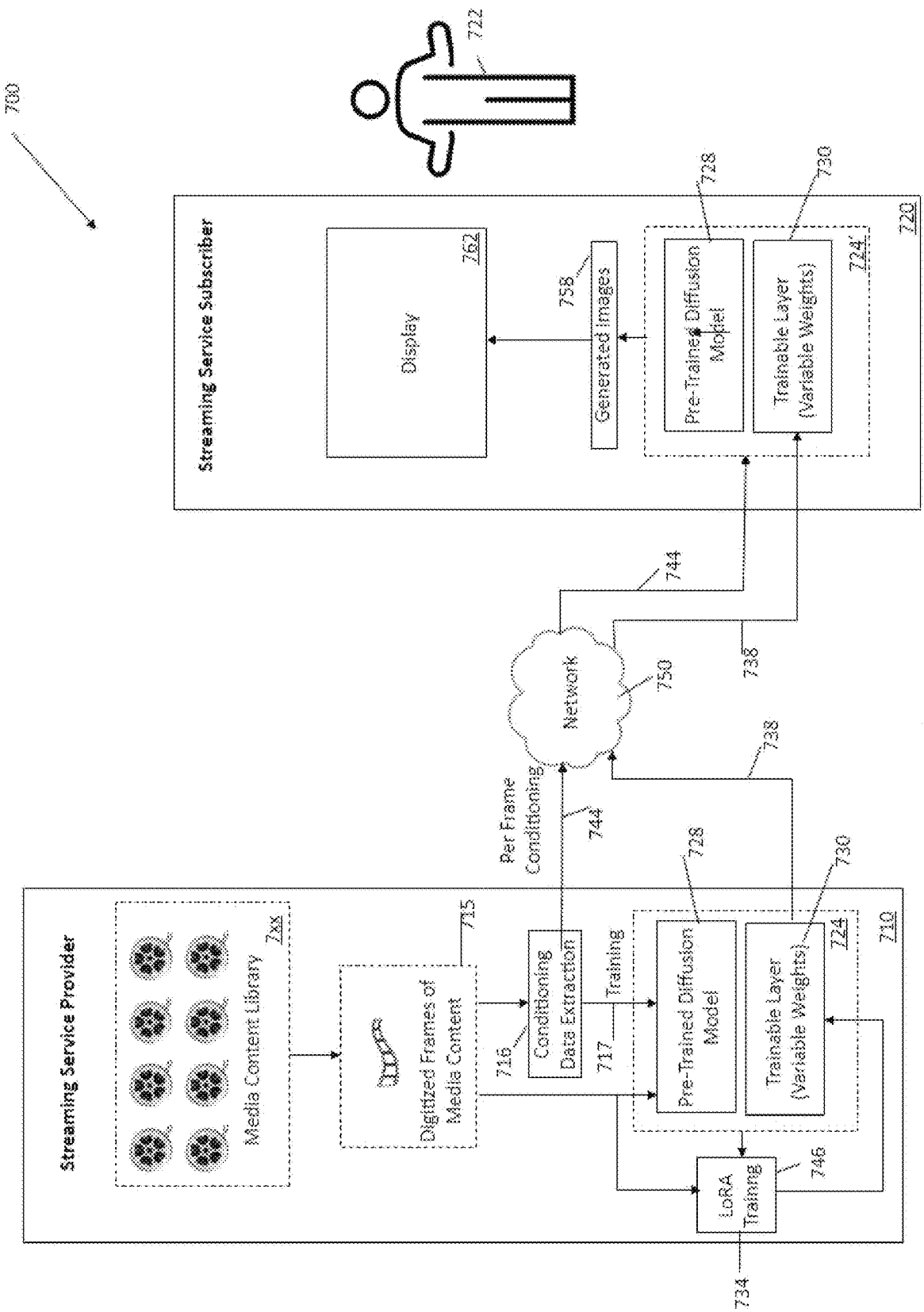
FIG. 7 illustrates a diffusion-based video streaming and compression system in accordance with another embodiment.

FIG. 7 illustrates a diffusion-based video streaming and compression system 700 in accordance with another embodiment. The system 700 includes a diffusion-based streaming service provider facility 710 configured to efficiently convey media content from a media content library 712 to diffusion-based streaming subscriber device 720. As shown, the diffusion-based streaming service provider facility 710 includes a diffusion model 724 that is conditionally trained during a training phase. In one embodiment the diffusion model 724 is conditionally trained using (i) digitized frames of media content 715 from one or more media files 724 (e.g., video files) included within the content library 712 and (ii) conditioning data 717 derived from image frames within the media content by a conditioning data extraction module 716. The conditioning data extraction module 716 may be configured to, for example, generate compressed versions of the image frames within the media content, derive edge detector output from the image frames, or otherwise derive representations of such image frames containing substantially less data than the image frames themselves.

As shown, the diffusion model 724 includes a pre-trained diffusion model 728 and trainable layer 730 of the pre-trained diffusion model 728. In one embodiment the pre-trained diffusion model 728 may be a widely available diffusion model (e.g., Stable Diffusion or the like) that is pre-trained without the benefit of the digitized frames of media content 715. During a training phase the diffusion model 724 is conditionally trained through a low-rank adaptation (LoRA) process 734 pursuant to which weights within the trainable layer 730 are adjusted while weights of the pre-trained diffusion model 728 are held fixed. The trainable layer 730 may, for example, comprise a cross-attention layer associated with the pre-trained diffusion model 728; that is, the weights in such cross-attention layer may be adjusted during the training process while the remaining weights throughout the remainder of the pre-trained diffusion model 728 are held constant. The diffusion model 724 may be trained in substantially the same manner as was described above with reference to training of the diffusion model 424 (FIG. 4); provided, however, that in the embodiment of FIG. 7 the training information is comprised of the digitized frames of media content 715 (e.g., all of the video frames in a movie or other video content) and the conditioning data 717 associated with each digitized frame 715.

Because during training of the diffusion model 724 only the model weights 738 within the trainable layer 730 of the diffusion model 724 are adjusted, a relatively small amount of data is required to be conveyed from the streaming facility 710 to the subscriber device 720 to establish a diffusion model 724' on the subscriber device 720 corresponding to the diffusion model 724. Specifically, only the weights 738 associated with the trainable layer 730, and not the known weights of the pre-trained diffusion model 728, need be communicated to the receiver 720 at the conclusion of the training process.

Once the diffusion model 724 has been trained and its counterpart trained model 724' have been established on the streaming subscriber device 720, generated images 758 corresponding to reconstructed versions of digitized frames of media content may be generated by the streaming subscriber device 720 as follows. For each digitized media content frame 715, the conditioning data extraction module 716 extracts conditioning data 744 from the media content frame 715 and transmits the conditioning data 744 to the streaming subscriber device 720. The conditioning data 744 is provided to the trained diffusion model 724', which produces a generated image 758 corresponding to the media content frame 715. The generated image 758 may then be displayed by a conventional 2D display or a volumetric display 762. It may be appreciated that because the amount of conditioning data 744 generated for each content frame 715 is substantially less than the amount of image data within each content frame 715, the conditioning data 744 may be viewed as a highly compressed version of the digitized frames of media content 715.

Moreover, although the trained diffusion model 724' may be configured to render generated images 758 which are essentially indistinguishable to a human observer from the media content frames 715, the pre-trained diffusion model 728 may also have been previously trained to introduce desired effects or stylization into the generated images 758. For example, the trained diffusion model 724' may (by virtue of certain pre-training of the pre-trained diffusion model 728) be prompted to adjusting the scene lighting (e.g., lighten or darken) within the generated images 758 relative to the media content frames 715 corresponding to such images. As another example, when the media content frames 715 include human faces and the pre-trained diffusion model 728 has been previously trained to be capable of modifying human faces, the diffusion model 724' may be prompted to change the appearance of human faces with within the generated images 758 (e.g., change skin tone, remove wrinkles or blemishes or otherwise enhance cosmetic appearance) relative to their appearance within the media content frames 715. Accordingly, while in some embodiments the diffusion model 724' may be configured such that the generated images 758 faithfully reproduce the image content within the media content frames 715, in other embodiments the generated images 758 may introduce various desired image effects or enhancements.

Figure 8:
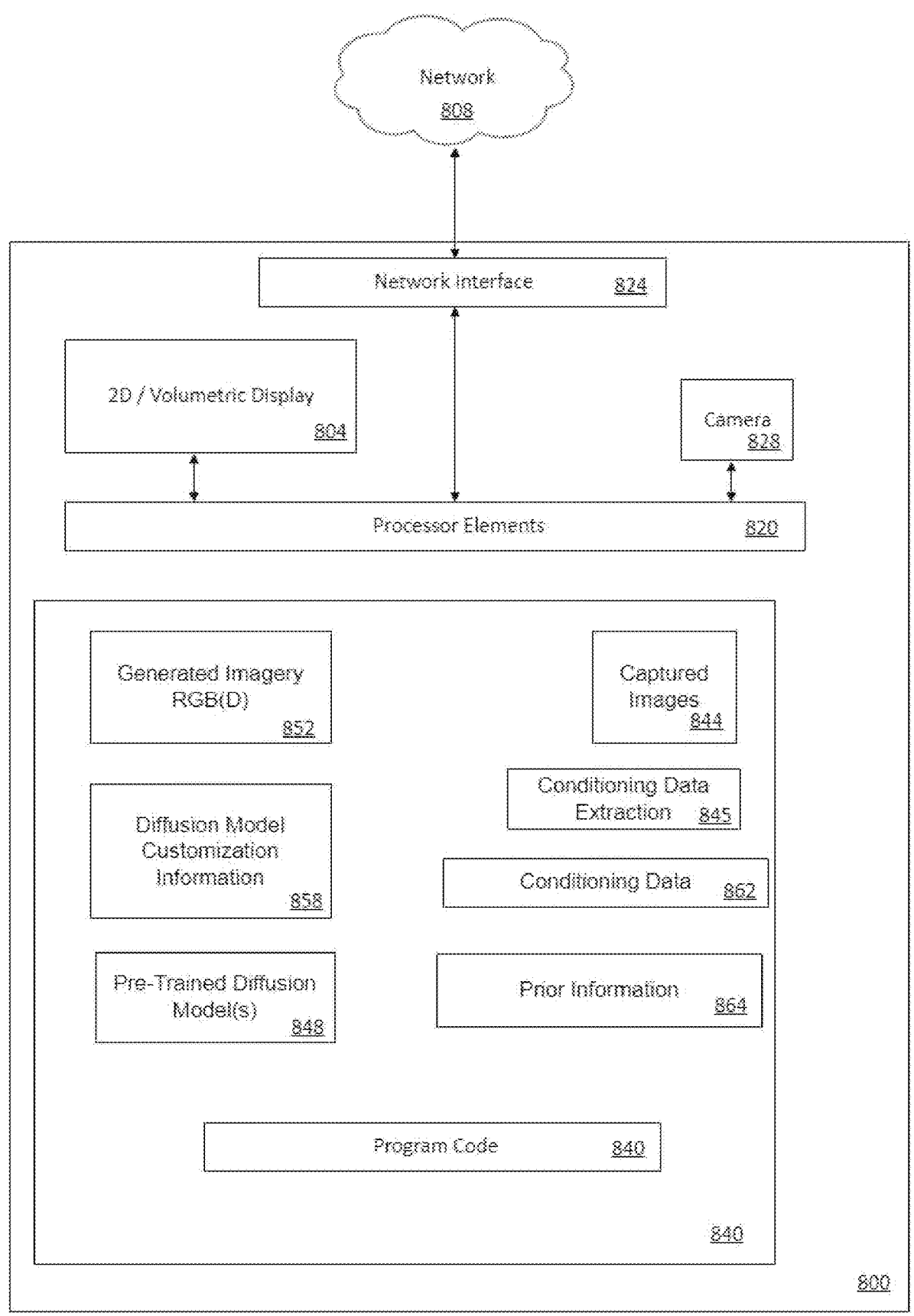
FIG. 8 is a block diagram representation of an electronic device configured to operation as a DNVS.

Attention is now directed to FIG. 8, which includes a block diagram representation of an electronic device 800 configured to operation as a DNVS sending and/or DNVS receiving device in accordance with the disclosure. It will be apparent that certain details and features of the device 800 have been omitted for clarity. The device 800 may be in communication with another DNVS sending and receiving device (not shown) via a communications link which may include, for example, the Internet, the wireless network 808 and/or other wired or wireless networks. The device 800 includes one or more processor elements 820 which may include, for example, one or more central processing units (CPUs), graphics processing units (GPUs), neural processing units (NPUs), neural network accelerators (NNAs), application specific integrated circuits (ASICs), and/or digital signal processors (DSPs). As shown, the processor elements 820 are operatively coupled to a touch-sensitive 2D/volumetric display 804 configured to present a user interface 208. The touch-sensitive display 804 may comprise a conventional two-dimensional (2D) touch-sensitive electronic display (e.g., a touch-sensitive LCD display). Alternatively, the touch-sensitive display 804 may be implemented using a touch-sensitive volumetric display configured to render information holographically. See, e.g., U.S. Patent Pub. No. 20220404536 and U.S. Patent Pub. No. 20220078271. The device 800 may also include a network interface 824, one or more cameras 828, and a memory 840 comprised of one or more of, for example, random access memory (RAM), read-only memory (ROM), flash memory and/or any other media enabling the processor elements 820 to store and retrieve data. The memory 840 stores program code 840 and/or instructions executable by the processor elements 820 for implementing the computer-implemented methods described herein.

The memory 840 is also configured to store captured images 844 of a scene which may comprise, for example, video data or a sequence of image frames captured by the one or more cameras 828. A conditioning data extraction module 845 configured to extract or otherwise derive conditioning data 862 from the captured images 844 is also stored. The memory 840 may also contain information defining one or more pre-trained diffusion models 848, as well as diffusion model customization information for customizing the pre-trained diffusion models based upon model training of the type described herein. The memory 840 may also store generated imagery 852 created during operation of the device as a DNVS receiving device. As shown, the memory 840 may also store various prior information 864.

Use of Low-Rank Adaptation (LoRA) Training in Video Communication and Streaming

In another aspect the disclosure proposes an approach for drastically reducing the overhead associated with diffusion-based compression techniques. The proposed approach involves using low-rank adaptation (LoRA) weights to customize diffusion models. Use of LoRA training results in several orders of magnitude less data being required to be pre-transmitted to a receiver at the initiation of a video communication or streaming session using diffusion-based compression. Using LoRA techniques a given diffusion model may be customized by modifying only a particular layer of the model while generally leaving the original weights of the model untouched. As but one example, the present inventors have been able to customize a Stable Diffusion XL model (10 GB) with a LoRA update (45 MB) to make a custom diffusion model of an animal (i.e., a pet dog) using a set of 9 images of the animal.

In a practical application a receiving device (e.g., a smartphone, tablet, laptop or other electronic device) configured for video communication or rendering streamed content would already have a standard diffusion model previously downloaded (e.g., some version of Stable Diffusion or the equivalent). At the transmitter, the same standard diffusion model would be trained using LoRA techniques on a set of images (e.g., on photos or video of a video communication participant or on the frames of pre-existing media content such as, for example, a movie or a show having multiple episodes). Once the conditionally trained diffusion model has been sent to the receiver by sending a file of the LoRA customizing weights, it would subsequently only be necessary to transmit LoRA differences used to perform conditional diffusion decoding. This approach avoids the cost of sending a custom diffusion model from the transmitter to the receiver to represent each video frame (as well as the cost of training such a diffusion model from scratch in connection with each video frame).

In some embodiments the above LoRA-based conditional diffusion approach could be enhanced using dedicated hardware. For example, one or both of the transmitter and receiver devices could store the larger diffusion model (e.g., which could be on the order of (10 GB)) on an updateable System on a Chip (SoC), thus permitting only the conditioning data metadata and LoRA updates in a much smaller file (e.g., 45 MB or less).

Some video streams may include scene/set changes that can benefit from further specialization of adaptation weights (e.g., LoRA). Various types of scene/set changes could benefit from such further specialization:

A scene that evolves gradually: e.g., subjects in motion
A scene that changes abruptly: e.g., a scene or set change.
A video stream may also alternate between sets.

Figures 9A, 9B:
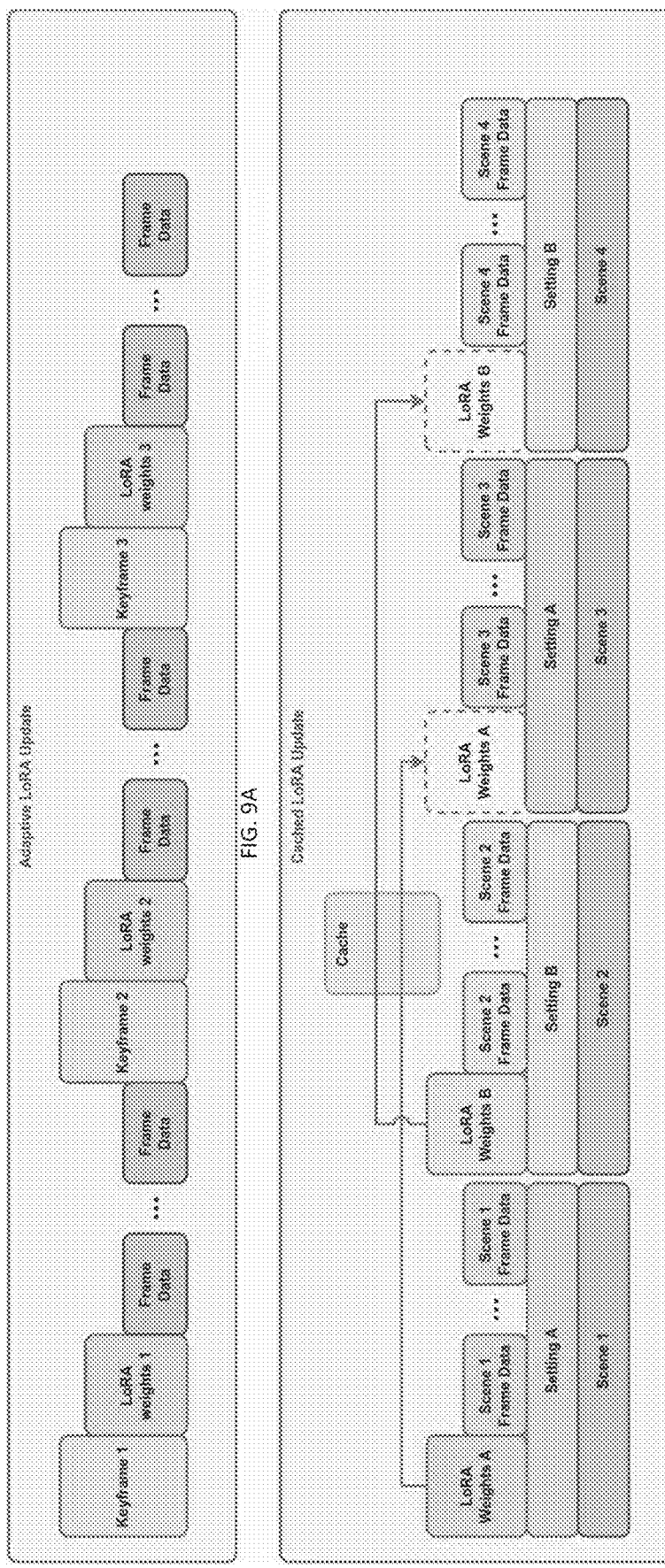
FIG. 9A illustrates LoRA adaptation weight updates throughout a transmitted video stream.
FIG. 9B illustrates LoRA adaptation weight updates cached and applied to different parts of a transmitted video stream.

FIGS. 9A and 9B illustrate approaches for further specialization of adaptation weights. The exemplary methods of FIGS. 9A and 9B involve update LoRA weights throughout the video stream (or file) being transmitted. In the approach of FIG. 9A, periodic weight updates are sent (for example with each new keyframe). In the approach of FIG. 9B, different weights may be cached and applied to different parts of the video, for example if there are multiple clusters of video subjects/settings.

Referring to FIG. 9A in more detail, as the LoRA weights are very small relative to image data, new weights could be sent frequently (e.g., with each keyframe), allowing the expressive nature of the diffusion model to evolve over time. This allows a video to be encoded closer to real time as it avoids the latency required to adapt to the entire video file. This has the additional benefit that if a set of weights is lost (e.g., due to network congestion), the quality degradation should be small until the next set of weights is received. An additional benefit is that the new LoRA weights may be initialized with the previous weights, thus reducing computational burden of the dynamic weight update at the transmitter. In a holographic chat scenario, the sender may periodically grab frames (especially frames not seen before) and update the LoRA model that is then periodically transmitted to the recipient, thus over time the representative quality of the weights continues to improve.

Turning now to FIG. 9B, as a video stream may alternate between multiple sets and subjects, we may also dynamically send new LoRA weights as needed. This could be determined adaptively when a frame shows dramatic changes from previous scenes (e.g., in the latent diffusion noise realization), or when the reconstruction error metric (e.g., PSNR) indicates loss of encoding quality.

As is also indicated in FIG. 9B, we may also cache these weights and reference previous weights. For example, one set of weights may apply to one set of a movie, whereas a second set of weights to a second set. As the scenes change back and forth, we may refer to those previously-transmitted LoRA weights.

Additional Prompt Guidance for Conditional Diffusion

A standard presentation of conditional diffusion includes the use of an unconditional model, combined with additional conditional guidance. For example, in one approach the guidance may be a dimensionality reduced set of measurements and the unconditional model is trained on a large population of medical images. See, e.g., Song, et al. "Solving Inverse Problems in Medical Imaging with Score-Based Generative Models"; arXiv preprint arXiv: 2111.08005 [ees-s.IV] (Jun. 16, 2022). With LoRA, we have the option of adding additional guidance to the unconditional model. Some examples We may replace the unconditional model with a LoRA-adapted model using the classifier-free-guidance method (e.g., StableDiffusion). In this case, we would not provide a fully unconditional response, but we would instead at a minimum provide the general prompt (or equivalent text embedding). For example, when specializing with dreambooth, the customization prompt may be "a photo of a <placeholder> person", where "<placeholder>" is a word not previously seen. When running inference we provide that same generic prompt as additional guidance. This additional guidance may optionally apply to multiple frames, whereas the other information (e.g., canny edges, face mesh landmarks) are applied per-frame.

We may also infer (or solve for) the text embedding (machine-interpretable code produced from the human-readable prompt) that best represents the image.

We may also provide a noise realization from either:

the noise state from a run of the forward process, inference (solve for) the best noise realization that produced the given text (e.g., via backpropagation), inference (solve for) the random number generator (RNG) seed that produced the noise state Finally, if we transmit noise, we may structure that noise to further compress the information, some options include:

imposing sparsity on the noise realization (e.g., mostly zeros) and compress that information before transmitting (e.g., only send the values and location of the non-zero values), use a predictable noise sequence (e.g., a PN sequence) that best initializes the data, as a maximal-length PN sequence may be compactly represented by only the state of the generator (e.g., a linear-feedback shift register).

Figure 10:
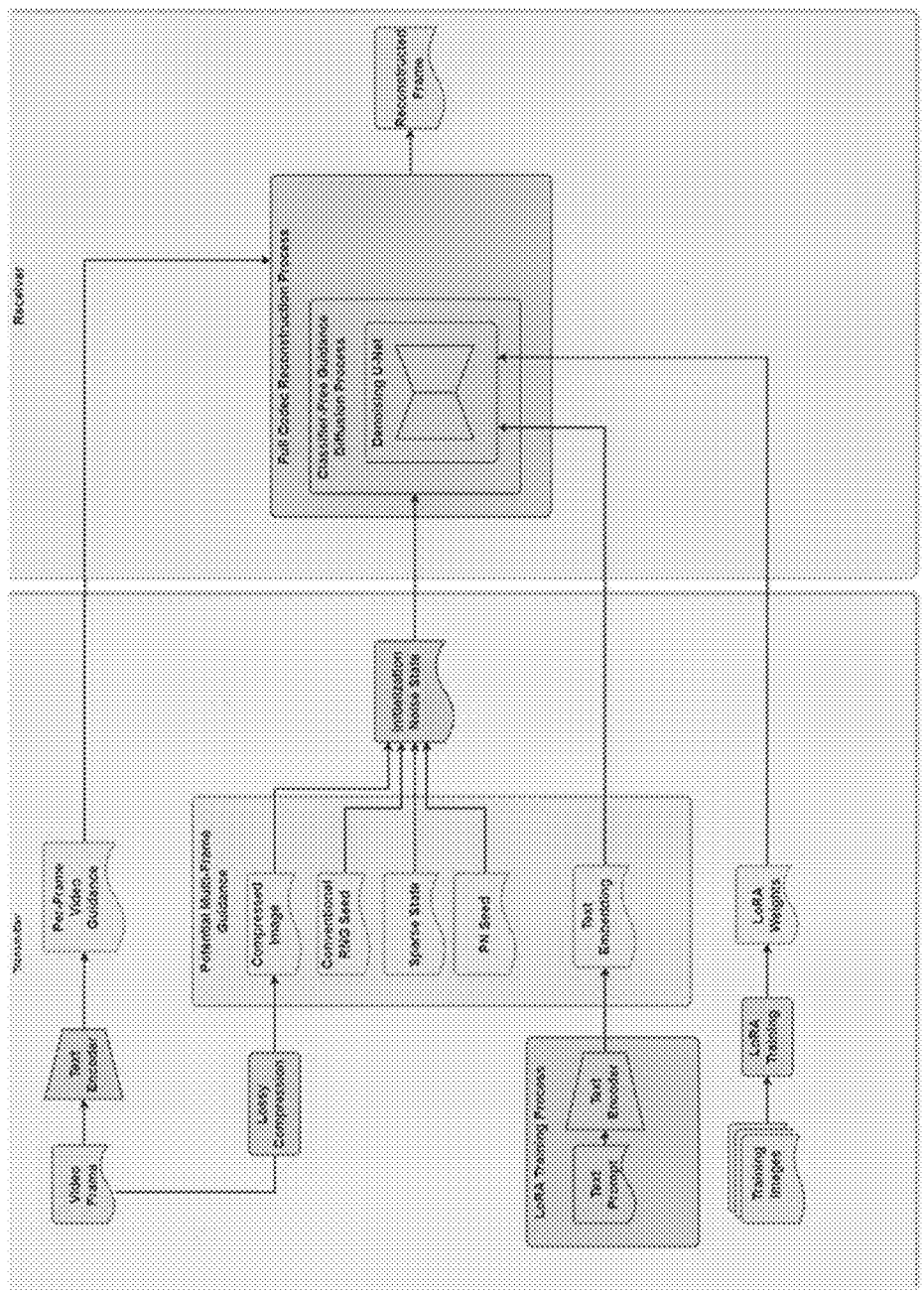
FIG. 10 illustrates an exemplary adapted diffusion codec process to reconstruct an image.

FIG. 10 illustrates an exemplary adapted diffusion codec process. A video frame is sent to a text encoder, which sends per-frame video guidance to a full code reconstruction process at a receiver. The video frame and subsequent frames are subject to lossy compression and multi-frame guidance that includes a conventional RNG seed, Sparse State, a PN seed and text embedding. Some guidance information (e.g., lossy initialization images, LoRA adaptation weights) may be shared across frames for diffusion-based video, but some information (e.g., canny edges, face landmarks) are used once per frame and thereby constitute per-frame video guidance. A single image may serve as guidance for multiple frames; that image may be low-resolution as we desire to keep the transmission small, and it is only used as an initialization; we may also compute or infer noise states that perform a similar function as it is used by the classifier-free-guidance diffusion process. Training images are applied to a LoRA training process to produce LoRA Weights. The LoRA updates the Denoising UNet. Variations on the image caption used for LoRA training process has text prompts processed by a text encoder, which forms text embeddings before consumption by the diffusion process. The diffusion process forms a reconstructed frame.

More recent (and higher resolution) diffusion models (e.g., StableDiffusion XL) may use both a denoiser network and a refiner network. In accordance with the disclosure, the refiner network is adapted with LoRA weights and those weights are potentially used to apply different stylization, while the adapted denoiser weights apply personalization. Various innovations associated with this process include:

Applying adaptation networks (e.g., LoRA) to any post-denoising refiner networks Applying adaptation to either or both Optionally, apply stylization to the refiner network while the denoiser network handles primary customization e.g., having a style for business (realistic representation, professional attire, well-groomed) and personal (more fun attire, hair color, or more fantastical appearance)

Real-Time Diffusion

When applying the diffusion methods herein to real-time video, one problem that arises is real time rendering given that a single frame would currently require at least several seconds if each frame is generated at the receive from noise. Modern denoising diffusion models typically slowly add noise to a target image with a well-defined distribution (e.g., Gaussian) to transform it from a structured image to noise in the forward process, allowing a ML model to learn the information needed to reconstruct the image from noise in the reverse process. When applied to video this would require beginning each frame from a noise realization and proceeding with several (sometimes 1000+) diffusion steps. This is computationally expensive, and that complexity grows with frame rate.

One approach in accordance with the disclosure recognizes that the previous frame may be seen as a noisy version of the subsequent frame and thus we would rather learn a diffusion process from the previous frame to the next frame. This approach also recognizes that as the frame rate increases, the change between frames decreases, and thus the diffusion steps required in between frames would reduce, and thus counterbalances the computational burden introduced by additional frames.

The most simplistic version of this method is to initialize the diffusion process of the next frame with the previous frame. The denoiser (which may be specialized for the data being provided) simply removes the error between frames. Note that the previous frame may itself be derived from its predecessor frame, or it may be initialized from noise (a diffusion analog to a keyframe)

A better approach is to teach the denoiser to directly move between frames, not simply from noise. The challenge is that instead of moving from a structured image to an unstructured image using noise that is well modeled (statistically) each step, we must diffuse from one form of structure to the next. In standard diffusion the reverse process is only possible because the forward process is well defined. This approach uses two standard diffusion models to train a ML frame-to-frame diffusion process. The key idea is to run the previous frame (which has already been decoded/rendered) in the forward process but with a progressively decreasing noise power and the subsequent frame in the reverse process with a progressively increasing noise power. Using those original diffusion models, we are able to provide small steps between frames, which can be learned with a ML model (such as the typical UNet architecture). Furthermore, if we train this secondary process with score-based diffusion (employing differential equations), we may also interpolate in continuous time between frames.

Once trained, the number of diffusion steps between frames may vary. The number of diffusion steps could vary based on the raw framerate, or it could dynamically change based on changes in the image. In both the total number of iterations should typically approach some upper bound, meaning the computation will be bounded and predictable when designing hardware. That is, with this approach it may be expected that as the input framerate increases, the difference between frames would decrease, thus requiring fewer diffusion iterations. Although the number of diffusion calls would grow with framerate, the number of diffusion iterations may reduce with framerate, leading to some type of constant computation or lower bound behavior. This may provide "bullet time" output for essentially no additional computational cost.

Additionally, the structured frame may itself be a latent representation. This includes the variational autoencoders used for latent diffusion approaches, or it may be the internal representation of a standard codec (e.g., H.264).

As this method no longer requires the full forward denoising diffusion process, we may also use this method to convert from a low-fidelity frame to a high-fidelity reconstruction (see complementary diffusion compression discussion below). A frame that is intentionally low-fidelity (e.g., low-pass filtered) will have corruption noise that is non-gaussian (e.g., spatially correlated), and thus this method is better tuned to the particular noise introduced.

Although not necessary to implement the disclosed technique for real-time video diffusion, we have recognized that the previous frame may be viewed as a noisy version of the subsequent frame. Consequently, the denoising U-Nets may be used to train an additional UNet which does not use Gaussian noise as a starting point. Similar opportunities exist for volumetric video. Specifically, even in the absence of scene motion, small changes occur in connection with tracked head motion of the viewer. In this sense the previous viewing angle may be seen as a noisy version of subsequent viewing angles, and thus a similar structure-to-structure UNet may be trained.

In order to improve the speed of this process, we may use sensor information to pre-distort the prior frame, e.g., via a low-cost affine Homomorphic transformation, which should provide an even closer (i.e., lower-noise) version of the subsequent frame. We may also account for scene motion by using feature tracking and combining with a more complex warping function (e.g., a thin-plate spline warping).

Finally, this technique need not be applied exclusively to holographic video. In the absence of viewer motion (i.e., holographic user head position changes), the scene may still be pre-distorted based on the same feature tracking described above.

Various innovations associated with this process include:
In holographic video, previous viewing angles may be seen as noisy versions of subsequent viewing angles and thus we may apply the same structure-to-structure UNet training as we did with time, but now as a function of angle.
We may combine this with dynamic scenes such that we train a UNet to adapt to both space and time
Whether we are tracking scene motion or head motion, we may further pre-distort the previous frame image based on additional data to provide a diffusion starting point that is closer to the subsequent frame (i.e., lower initial noise).
We may use feature tracking to compute scene changes
We may use accelerometer information or pose estimated from features/fiducial markers to estimate head motion
We may then apply affine transformations or more complex warping such as thin plate splines to pre-distort
This may work with scene motion only, viewer motion only, or both motions, thus it may be applied to both 2D and 3D video diffusion In the previous section, the use of splines was mentioned as a way of adjusting the previous frame to be a better initializer of the subsequent frame. The goal of that processing was higher fidelity and faster inference time. However, the warping of input imagery may also serve an additional purpose. This is particularly useful when an outer autoencoder is used (as is done with Stable Diffusion), as that can struggle to faithfully reproduce hands and faces when they do not occupy enough of the frame. Using a warping function, we may devote more pixels to important areas (e.g., hands and face) at the expense of less-important features. Note we are not proposing masking cropping and merging, but a more natural method that does not require an additional run Furthermore, there are additional benefits beyond just faithful human feature reconstruction. We may simply devote more latent pixels to areas of the screen in focus at the expense of those not in focus. This would not require human classification. Note that "in-focus" areas may be determined by a Jacobian calculation (as is done with ILC cameras). While this may improve the fidelity of the parts the photographer/videographer "cares" about, this may also allow a smaller size image to be denoised with the same quality, thus improving storage size and training/inference time. It is likely that use of LoRA customization on a distorted frame (distorted prior to VAE encoder) will produce better results.

Various innovations associated with this process include:
Naturally distort an image based on important features detected (e.g., hands, face) to improve perceptual inference quality
use a complex spline (e.g., thin-pate-spline) to avoid needing to mask, join or run diffusion multiple times.
Naturally distort an image based on in-focus (or areas with high sharpness or detail) at the expense of low-frequency areas (e.g., smooth walls, or areas out of focus).
we may determine this via a Jacobian or other measure of sharpness on the latent pixels
this will naturally improve image quality to faces and hands (presuming they are in focus by the photographer)
this will naturally improve overall image quality
this may also allow us to use smaller image resolution (improving computation time).
We may combine this with LoRA customization
apply the distortion outside of the VAE autoencoder then use LoRA to work with distorted images Audio-Guided Diffusion In one embodiment methods such as ControlNet are extended to include facial expressions as guided by phonetic sound and/or sentiment. Both of those could be detected from audio analysis algorithms, and optionally translated to a different language by another algorithm. In video chat applications, by sending the time-aligned phonetics/sentiment it is possible to further refine the facial expression of the transmitted subject with extremely low-bandwidth additional data. When used with, for example, LoRA customization, training could involve either (1) prompting the subject to say words containing all different phonetics, and/or (2) utilizing natural video (e.g., past video chats) as training information linking audio content and facial expression.

Figure 11:
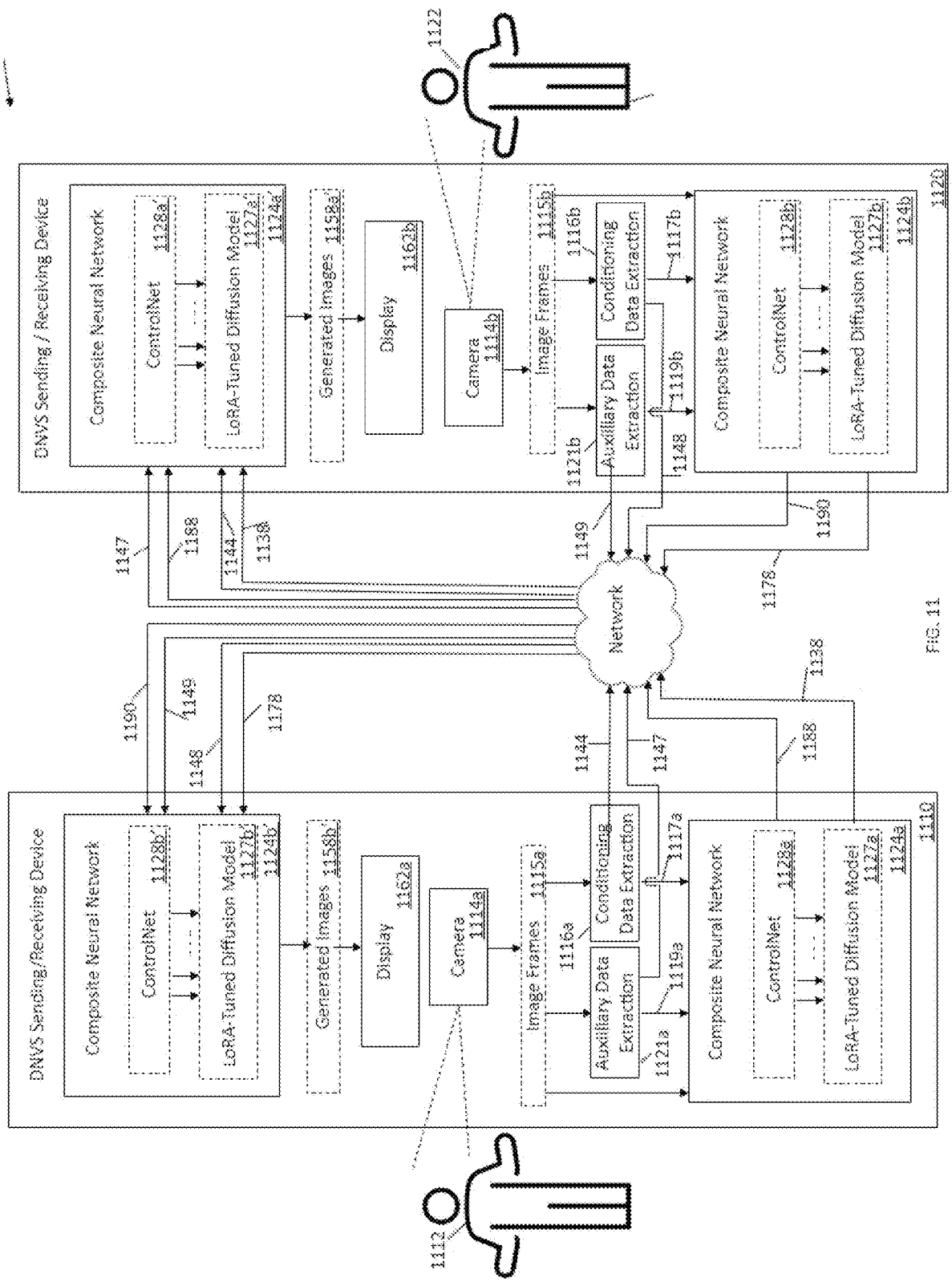
FIG. 11 illustrates a diffusion-based novel view synthesis (DNVS) communication system utilizing audio-guided diffusion in accordance with an embodiment.

Attention is now directed to FIG. 11, which illustrates a diffusion-based novel view synthesis (DNVS) communication system 1100 utilizing audio-guided diffusion in accordance with an embodiment. As shown, a first user 1112 is associated with a first DNVS sending/receiving device 1110 and a second user 1122 is associated with a second DNVS sending receiving device 1120. In the embodiment of FIG. 11 both the first DNVS sending/receiving device 1110 and the second DNVS sending/receiving device 1120 are capable of training composite neural networks 1124a, 1124b representative of an object or scene. The composite neural networks 1124a, 1124b each include a first neural network implementing a LoRA-tuned diffusion model 1127a, 1127b in combination with a second neural network implementing a ControlNet 1128a, 1128b. A ControlNet is a is a neural network that allows for fine-tuning pre-trained diffusion models, such as the LoRA-tuned diffusion models 1127a, 1127b, to achieve more control over the image generation process. See, Zhang, L., Rao, A., & Agrawala, M. (2023 Feb. 10). "Adding conditional control to text-to-image diffusion models". arXiv: 2302.05543.

The composite neural networks 1124a, 1124b may be trained using training data including (i) image frames 1115a, 1115b, (ii) conditioning data 1117a, 1117b derived from the image frames 1115a, 1115b by conditioning data extraction modules 116a, 116b, and (iii) auxiliary data 1119a, 1119b derived by auxiliary data extraction modules 1121a, 1121b from audio content associated with the image frames 1115a, 1115b. In one embodiment training of the composite neural networks 1124a, 1124b is accomplished in two training phases. During a first training phase LoRA-based techniques are used to initially train the diffusion models 1127a, 1127b within the composite neural networks 1124a, 1124b using image frames 1115a, 1115b and conditioning data 1117a, 1117b derived from the image frames 1115a, 1115b. In a second training phase the ControlNet 1128a, 1128b within each composite neural network 1124a, 1124b is trained using other image frames 1115a, 1115b and auxiliary data 1119a, 1119b derived from the other image frames 1115a, 1115b.

During the first training phase the diffusion models 1127a, 1127b are conditionally trained through a low-rank adaptation (LoRA) process pursuant to which weights within trainable layers of the diffusion models 1127a, 1127b are adjusted while the remaining weights of the diffusion models 1127a, 1127b, which typically have been pre-trained, are held fixed. The trainable layers of the diffusion models 1127a, 1127b may, for example, comprise a cross-attention layer; that is, the weights in such cross-attention layer may be adjusted during the training process while the remaining weights throughout the remainder of the diffusion models 1127a, 1127b are held constant. The diffusion models 1127a, 1127b may be conditionally trained using the training data including the image frames 1115a, 1115b and the conditioning data 1117a, 1117b derived from the training image frames 1115a, 1115b in substantially the same manner as was described above with reference to training of the diffusion model 424 (FIG. 4). Once the diffusion models 1127a on the first DNVS device 1110 has been trained, weights 1138 for the trainable layers of the conditionally trained model 1127a are sent to the second DNVS device 1120. At the second DNVS 1120 the weights 1138 are used to tune or otherwise configure the weights of a trainable layer of a diffusion model 1127a' such that the tuned diffusion model 1127a' essentially replicates the conditionally trained diffusion model 1127a. Similarly, at the first DNVS 1110, weights 1178 received from the second DNVS 1120 are used to tune or otherwise configure the weights of a trainable layer of a diffusion model 1127b' such that the tuned diffusion model 1127b' essentially replicates the conditionally trained diffusion model 1127b. Updates to the weights 1138, 1178 may optionally be sent following additional LoRA-based training using additional training image frames 1115a, 1115b.

Once the diffusion models 1127a, 1127b have been conditionally trained as discussed above, the composite neural networks 1124a, 1124b as configured with the diffusion models 1127a, 1127b may be further trained during the second training phase. The additional training data using in the second training phase includes additional image frames 1115a, 1115b and auxiliary data 1119a, 1119b derived from the image frames 1115a, 1115b. Again, the auxiliary data 1119a, 1119b is derived by auxiliary data extraction modules 1121a, 1121b from audio content associated with image frames 1115a, 1115b included within the additional training data. In one embodiment the audio content corresponds to speech from a human subject present within such image frames 1115a, 1115b and the auxiliary data is in the form of phonetic data generated by algorithms executed by the auxiliary data extraction modules 1121a, 1121b. Alternatively, or in addition, the auxiliary data may be in the form of sentiment data generated by algorithms executed by the auxiliary data extraction modules 1121a, 1121b based upon the speech of the subject.

During training of the composite neural networks 1124a, 1124b during the second training phase, training data including image frames 1115a, 1115b involving the subject and auxiliary data 1119a, 1119b derived from audio data associated with the image frames 1115a, 1115b are provided to the composite neural networks 1124a, 1124b. The ControlNet 1128a, 1128b or other control neural network within each composite neural network 1124a, 1124b preferably includes a trainable copy of one or more layers of the artificial neural network implementing the LoRA-tuned diffusion model 1127a, 1127b within such composite neural network 1124a, 1124b. During this second training phase, values of the weights of the ControlNet 1128a, 1128b are adjusted while values of the weights of the LoRA-tuned diffusion model 1127a, 1127b remain constant.

The image frames 1115a, 1115b of training data utilized during the second training phase may, for example, be included within a training video of the subject speaking a specified set of words. The set of words may be selected so as to collectively include substantially all phonetics associated with a language being spoken by the subject. During the second training phase the subject may be prompted to speak the words while the training video is being recorded. Alternatively, the image frames 1115a, 1115b used during the second training phase may be included within one or more videos of the subject speaking which are recorded prior to initiation of the second training phase.

Figure 12:
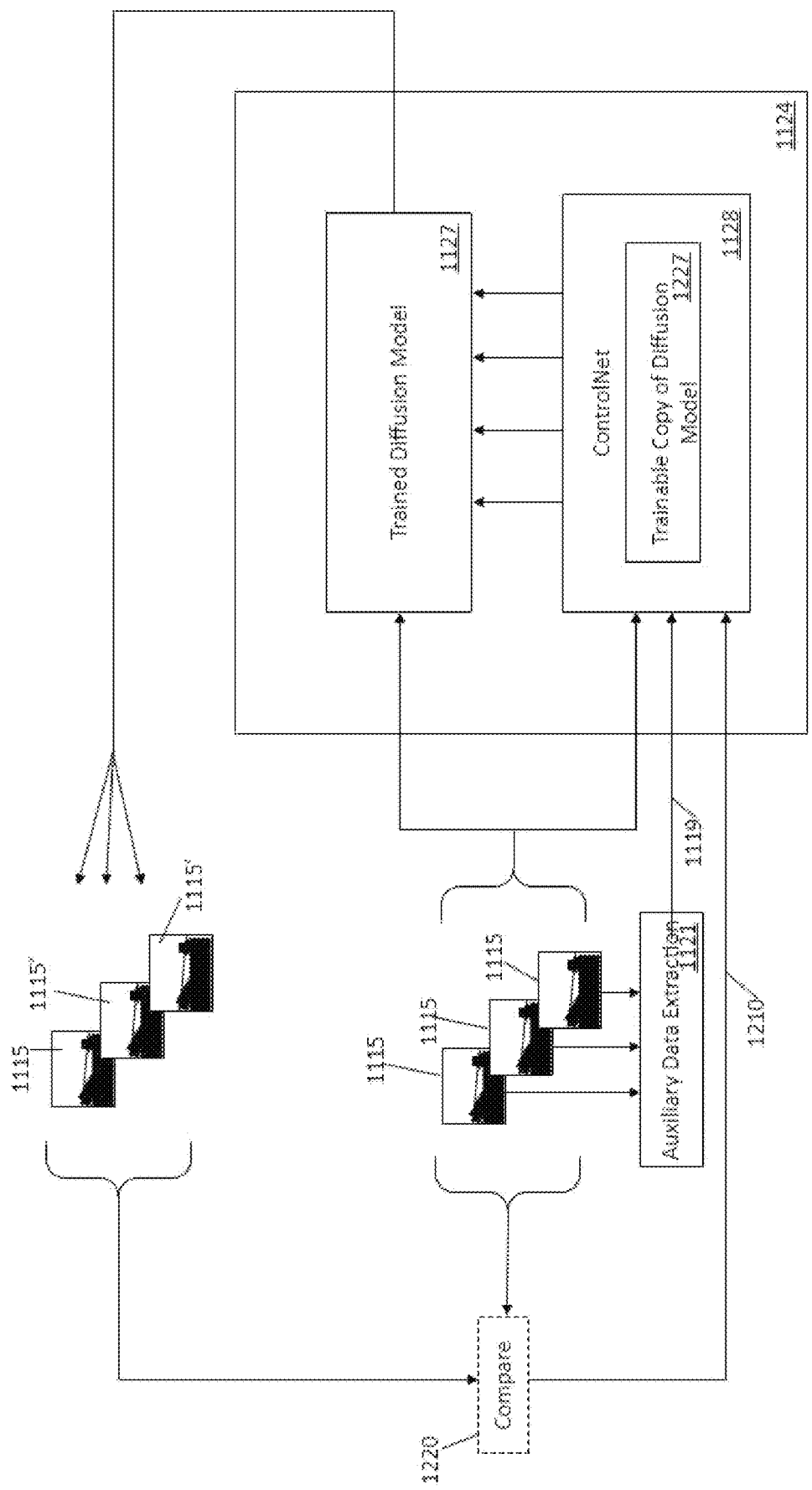
FIG. 12 illustrates additional details of the second training phase pursuant to which the ControlNet within each composite neural network is trained.

FIG. 12 illustrates additional details of the second training phase pursuant to which the ControlNet 1128 within each composite neural network 1124 is trained. Again, during the first training phase the diffusion model 1127 is trained using image frames 1115 and conditioning data 1117 derived from the image frames 1115 in the manner discussed above. Upon completion of the first training phase, the ControlNet 1128 is configured to include a trainable copy 1227 of the diffusion model 1127 trained during the first training phase. During the second training phase, additional image frames 1115 are provided to the trained diffusion model 1127 and to the ControlNet 1128. Auxiliary data 1119 extracted from audio information associated with the additional image frames is also provided to the ControlNet 1128. Weights of the ControlNet 1128 are then adjusted 1210 based upon a comparison 1220 of reconstructed images 1115' generated through the diffusion process effected by the composite neural network 1124 to the image frames 1115 used for training. The use of the audio-related auxiliary data 1119 during the second training phase may advantageously allow the facial expressions of the subject speaking within the reconstructed images 1115' to be sufficiently refined to closely match those of the subject when speaking within the image frames 1115 used for training.

Referring again to FIG. 11, once training of the ControlNet 1128 within each composite neural network 1124 is has been completed, weights 1188 for the ControlNet 1128a are sent by the first DNVS device 1110 to the second DNVS device 1120. At the second DNVS 1120 the weights 1188 are used to configure the weights of a counterpart ControlNet 1128a' such that the composite neural network 1124' essentially replicates the composite neural network 1124 within the first DNVS 1110. Similarly, at the first DNVS 1110, weights 1190 received from the second DNVS 1120 are used to configure the weights of a counterpart ControlNet 1128b' such that the composite neural network 1124b' essentially replicates the composite neural network 1124b.

Once the counterpart composite neural networks 1124a', 1124b' have been established on the first and second DNVS devices 1110, 1120, operation in an inference phase may be initiated. During inference, generated images 1158 corresponding to reconstructed versions of new image frames acquired by the camera 1114 of one of the DNVS devices 1110, 1120 may be generated by the other of the DNVS devices 1110, 1120. For example, consider the case in which the second DNVS device 1120 operates to reconstruct new image frames 1115a acquired by the camera 1114a of the first DNVS device 1110. In this case, upon a new image frame 1115a becoming captured by the camera 1114a, the conditioning data extraction module 1116a extracts conditioning data 1144 from the new image frame 1115a and transmits the conditioning data 1144 to the second DNVS device 1120. In addition, the auxiliary data extraction module 1121a extracts auxiliary data 1147 from the new image frame 1115a and transmits the auxiliary data 1147 to the second DNVS device 1120. At the second DNVS device 1120, the conditioning data 1144 is provided to the LoRA-tuned diffusion model 1127a' and the auxiliary data 1147 is provided to the ControlNet 1128a'. The composite neural network 1124a' then produces generated images 1158a' corresponding to the new image frames 1115a captured by the camera 1114a. The generated images 1158a' may then be displayed by a conventional 2D display or a volumetric display 1162b.

Similarly, the first DNVS device 1110 may operate to reconstruct new image frames 1115b acquired by the camera 1114b of the second DNVS device 1120. In this case, upon a new image frame 1115b becoming captured by the camera 1114b, the conditioning data extraction module 1116b extracts conditioning data 1148 from the new image frame 1115b and transmits the conditioning data 1148 to the first DNVS device 1110. In addition, the auxiliary data extraction module 1121b extracts auxiliary data 1149 from the new image frame 1115b and transmits the auxiliary data 1149 to the first DNVS device 1110. At the first DNVS device 1110, the conditioning data 1148 is provided to the LoRA-tuned diffusion model 1127b' and the auxiliary data 1149 is provided to the ControlNet 1128b'. The composite neural network 1124b' then produces generated images 1158b' corresponding to the new image frames 1115b captured by the camera 1114b. The generated images 1158b' may then be displayed by a conventional 2D display or a volumetric display 1162a.

Diffusion-Based Personalized Advertising Image Generation

Various systems and methods may be used to efficiently and cost effectively personalize imagery used in advertising products and services. Diffusion-based techniques are utilized to generate advertising imagery in which the promoted product or service is placed in a scene familiar to a particular recipient of an advertisement. In one approach, a diffusion process is used to generate the personalized advertising imagery solely on an electronic device of the advertisement recipient. This advantageously preserves privacy and requires no human intervention in the generation process. Any generated images could be integrated either at the browser level (plugin) or at the device operating system level (e.g., iOS®/Android®) to place customized images for supporting websites or webapps or apps or compute applications.

Figure 13:
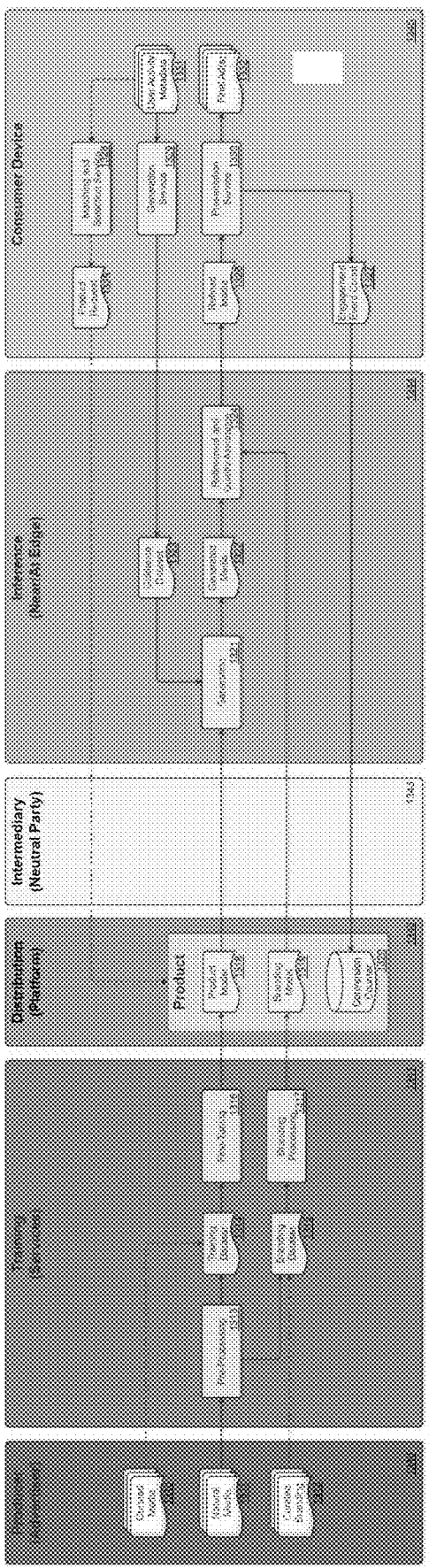
FIG. 13 showcases a High-level overview of a variant of the disclosed architecture where data curated by an advertiser advances laterally through a system of training and distribution to an edge provider for consumer device access and rendering.

The architecture options of our method are flexible, with one variation shown in FIG. 13. Natural imagery 1311 is provided to a preprocessing step 1313 that extracts fine-tuning training data 1316 and information for a brand standard 1317. The advertiser can control, curate, or fine-tune the reference imagery 1310 and branding standard 1312. The models (in the form of lightweight Parameter-Efficient Fine-Tuning (PEFT) adaptation weights) are made available to the consumer via a distribution platform 1342, which may be specialized for our method or served by existing or future ad platforms. Starting from the right, metadata 1331 (opt-in) is obtained from the user and is used to guide the inference (ad generation) step 1321, followed by a refinement step for quality and branding assurance 1324. This refined media 1326 is then made available to the end user 1330, where the only required feedback is an engagement 1327 or conversion counter 1320. We show the inference as outside the consumer device to demonstrate flexibility, but this step may also occur on-device or within a trusted environment (e.g., a photo service) already entrusted with private user data and given consent to use the data for ad generation purposes. Finally, we show the optional matching service 1328 which further preserves privacy, although other variations are possible. While the method allows for fully on-device (edge) processing and matching, inference can also occur within a trusted cloud environment. The use of metadata derived from personal imagery or precise location information is optional. While it provides a rich dataset for personalization and matching, it is among the more sensitive personal data. Processing on platforms (e.g., Instagram®) where this information has been intentionally selected and shared publicly, with guardrails and consent, is an alternative method that may be more acceptable than on-device access for some users. Another variation is to generate website-specific advertisements, allowing for indirect personalization for site visitors without using personal information or requiring edge-based processing. Our method is designed to work with no human interaction during both the training and inference steps, other than requiring the advertiser to provide natural imagery for training. We believe this achieves maximum scalability and flexibility. However, variations with more interaction are possible, including options for more manual expert curation, stronger creative guidance, a photo editor-like user interface, or a software service. Additionally, while we focus on the simpler case of personalized product placement, the generation service on the consumer device could potentially produce a PEFT (LoRA) of the end user.

Exemplary Embodiment

In one embodiment, a diffusion model is fine-tuned (e.g., via LoRA in the manner discussed above) based upon images of one or more scenes associated with a particular advertising recipient. These images may, for example, be available on the recipient's electronic device (e.g., via Google Photos®, Instagram®). Once fine-tuned, the diffusion model may be used to generate a "similar" scene (or a scene that matches a single photo) and place services/products in that scene. The entire fine-tuning and personalized generation may happen on device (if computation power permits) allowing privacy preservation. Additionally, the product or services may also be generated via diffusion fine-tuning from natural and/or controlled images. When fine-tuning (either of the recipient or the advertiser) from natural images, auto-captioning may be used to increase the quality of the placement. When fine-tuning, the geolocation information (e.g., via object recognition or Exchangeable Image File Format (EXIF) metadata) may be used for further personalization. EXIF is a standardized way of storing information in digital image files. EXIF characterizes how the image was created. The characterization may include the time and date the image was taken, the camera and lens used and shooting settings.

One way this technique could be implemented would be through employing multi-concept fine-tuning. For example, a diffusion model would initially be taught what the product/service is by using a unique token (e.g., <P>) with a single caption, manual per-image captions or automated per-image captions. Consider one specific example:

"product <P> in an upscale apartment",

"product <P> closeup, well-lit", or

"product <P> thanskgiving"

For the recipient (including on-device processing), a selection of images would be used to fine tune the "environment" of the user, for example:

"scene <S> apartment",

"scene <S> neighborhood", or

"scene <S> at Thanskgiving"

Then also at the recipient, the inference to generate the model would be:

"product <P> in scene <S>" or

"product <P> in scene <S> at Thanksgiving"

Lastly, sequential generation where LoRA #1 (e.g., the scene) is used then in a second pass LoRA #2 is used (the product or person), which may be implanted for placement. We may replace existing elements (e.g., soda bottle) with specific variants (e.g., a new flavor from a specific brand).

Variations

Token Variations

Note that we may choose to override (intentionally overfit) an existing token by choosing a similar or class of objects for <P>, e.g., use something like "soda" when advertising a beverage. Similarly, an "average" location may be used in place of <S> (e.g., "Manhattan"). This gives the model a better starting point.

Exact Image Placement

If an exact scene placement is desired, then the desired image may be used as guidance in one or more ways (e.g., ControlNet or other hard-data constraint methods). ControlNet is an open industrial network protocol for industrial automation applications.

Use with Services

We may also desire to personalize more intangible services by fine-tuning verbs (e.g., house painting) rather than nouns (e.g., house paint). An example prompt would be "house painting <P> on <S> house"

Prompt-Only Version Based on History

We may also want to train from simply a prompt that is relevant to the recipient based on other historical data (e.g., browsing history). Large-language models and underlying methods (e.g., text embeddings) may be used to infer relevant keywords for the recipient, then those words are used in a prompt. For example, a search for sunglasses and chlorine would imply a "pool" keyword, whereas searches for sunglasses and emergency life preservers might imply "boating". We may instead choose to include existing advertising methodologies to identify keywords relevant to the consumer (and appropriate product matches). In this case, the personalized prompt may be.

"product <P1> in a boating scene" or

"product <P2> in a pool scene"

Personalization Options

When personalizing advertising, there are various dimensions that can be personalized. This personalization applies not only to the consumer, who has individual preferences, but also to the advertiser, who may have multiple classes of products and brand aesthetics. Additionally, by personalizing advertising based on the content of a website (e.g., the text or image content of a fan-fiction site), the interests of visitors can be inferred, and indirect personalization may be provided without using any personal data.

In TABLE I, we list a sample of these classes and provide examples of ways to personalize for each class.

TABLE I

| Class | Personalized to Producer | Personalized to Consumer |
| --- | --- | --- |
| Subject | Spokesperson, Mascot | Individual, Family, Friends |
| Object | Product | Furniture, Items Owned |
| Location | Destination, Service | Nearby Landmarks, Street, House |
| Style | Designer Style | House Style, Clothing Style |
| Aesthetic | Brand Aesthetic | Preferences, Interests |
| Cultural | Brand Culture | Personal Culture, Societal Norms |

The list is not exhaustive, and we may apply weighted combinations of these values. The method of implementation may include a variety of inputs, including PEFT (LoRA) weights, text guidance derived from metadata, text-to-image or IP Adapters imagery guidance, or any other current or future ControlNet-like guidance. Personalization may be achieved not only with positive prompts but also with negative prompts. By providing descriptions (or encoded embeddings) that indicate what not to show, more control over the appropriateness and cultural sensitivity of the generated imagery can be ensured. Especially within the dimension of cultural personalization, the use of more negative prompts may help avoid unintentional stereotyping in the output.

Metadata

The goal of metadata processing is to convert any form or resolution of personalization data into information that the generative AI can use for guidance and fine-tuning, while ensuring privacy is respected. One example source of metadata is location data, which can be provided at various resolutions, including country, region, city, zip code, street address, and latitude/longitude. This location data can be converted into descriptions of those locations or nearby landmarks, which can be used to personalize the background setting. The lookup of setting descriptions to text can occur from open-source information (e.g., Wikipedia®), private data sources (e.g., map services), or a third-party API. If location data is unavailable, a natural language local weather report may serve as a sufficient proxy and be ingested directly into a diffusion model prompt. While weather varies greatly even day to day for a single location, it is more likely to be relevant to the current activities of the end user at the time of year. For example, consumers in tropical locations may have little interest in snowy settings, while those in northern or mountainous locations may care very much about snow activities. Diffusion models can ingest weather information in its natural language form, so weather reporting APIs based on location can be used with minimal processing. A rich source of metadata is personal imagery. While such imagery could be used to train a set of PEFT (LoRA) weights to capture the likeness of the individual, methods such as auto-captioning also provide metadata and may offer hints to consumer preferences, interests, hobbies, or aesthetic style. This information can be used as prompt information to avoid using personal likeness or biometrics, which can seem invasive, or it can be used for product matching, aesthetic influence of the advertisement, or cultural sensitivity assurance. If consent is provided to use personal imagery for metadata, it is essential to apply an "inappropriate" or "sensitive" content filter and age detection (for filtering minors). Many of these processes may already occur upon upload to cloud imagery services, but they could also be run as local models. Even if captions are the only metadata retained, a content filter on both the imagery and the generated captions should be applied (along with a filter on the generated output). Provided that the content filtering process is handled in a privacy-preserving manner, these methods will help mitigate intrusiveness and provide additional privacy protection.

LoRA Fine Tuning

In this section, we demonstrate the effectiveness of the LoRA PEFT method for product localization. LoRA is a lightweight adapter that allows the original diffusion model (Stable Diffusion XL (SDXL) in this case; SDXL is a text-to-image generation model that iterates on previous Stable Diffusion models) to be inexpensively adapted. We show several examples to demonstrate the performance of LoRA fine-tuning for both known and unknown products to the original model, and we compare the fine-tuning performance with one of the most state-of-the-art methods (FLUX). FLUX is a set of text-to-image generation models. The models are built on the diffusion transformer architecture, which allows models with a high number of parameters to maintain efficiency. In all cases, we leverage the preprocessing pipeline described in the Section titled "IMPLEMENTATION, PRE-PROCESSING AND POST-PROCESSING".

In FIG. 14B, we show sample inference results of a prompt for a Jeep and compare it to the non-fine-tuned output in FIG. 14A. The base SDXL model, trained on a large corpus of commonly available imagery, is expected to know the concept of a Jeep® well, even without fine-tuning. The imagery shows that the concept of a Jeep without fine-tuning (FIG. 14A) is an amalgamation of various model variations and may include stylistic depictions or aftermarket variations from the training set. Additionally, the model may slightly mix the concept of a Jeep® with larger SUVs (e.g., a Hummer®). As shown in FIG. 14B, our fine-tuning process clearly and accurately represents a modern Jeep® with training from approximately 20 natural images.

Figure 15C:
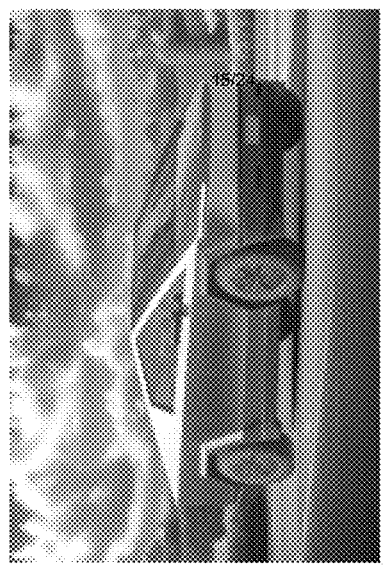
FIG. 15C shows the same vehicle with image guidance and LoRA-based fine-tuning.
Figure 15B:
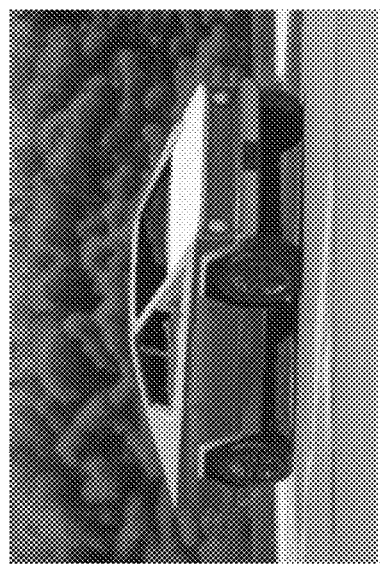
FIG. 15B shows the same vehicle with image guidance added.
Figure 15A:
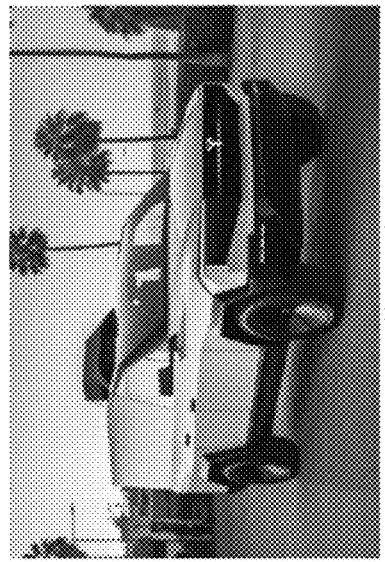
FIG. 15A shows generated imagery of the Tesla® Cybertruck® with erroneous features in the absence of fine-tuning.
Figure 16A:
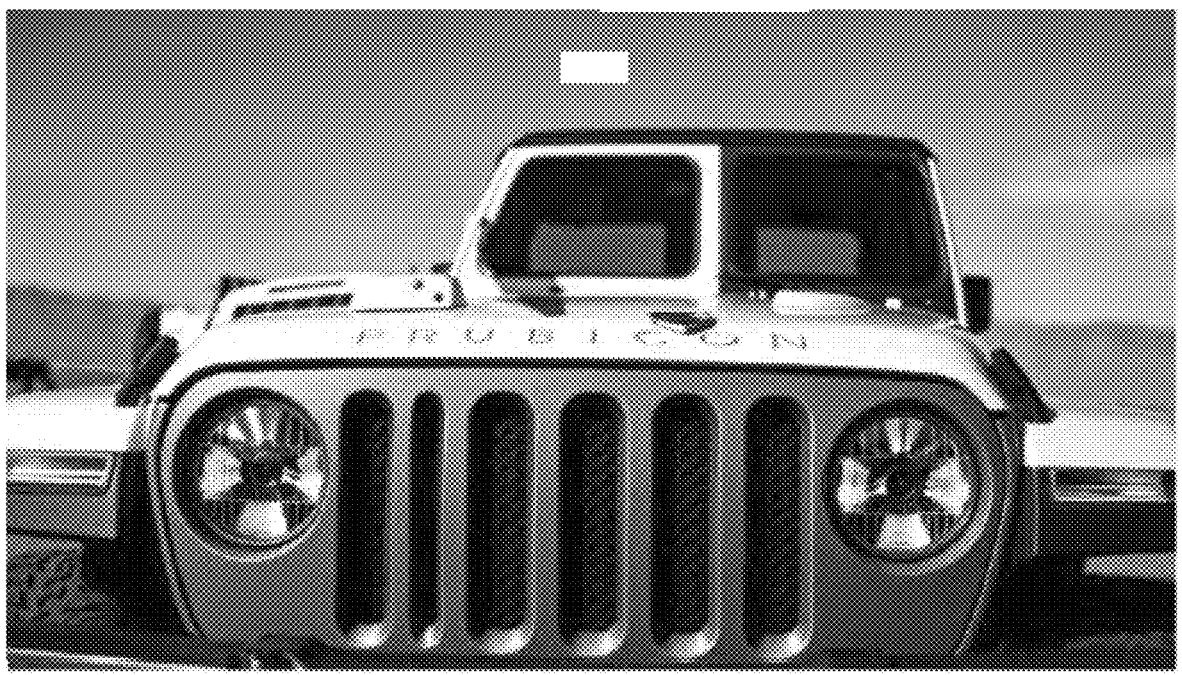
FIG. 16A is a representation of the open-source Snell-variant of FLUX.
Figure 16B:
FIG. 16B is a vehicle formed by the trained and guided disclosed fine-tuning pipeline.

While FIG. 14B shows how a well-known concept benefits from fine-tuning, we also demonstrate that the diffusion process can effectively learn new concepts. To illustrate this, we use a different vehicle, the Tesla® Cybertruck®, which was first delivered in 2023, several months after the SDXL model was first trained in July 2023. While some press-release and publicity event imagery were available at the time of SDXL training, the concept of a Cybertruck® is poorly understood by the standard SDXL model, as shown with the disfigured vehicle of FIG. 15A. Even when using image-to-image guidance, an inaccurate vehicle is generated, as shown in FIG. 15B. However, our fine-tuning pipeline effectively and inexpensively learns the concept, as shown in the generated image of FIG. 15C. While aftermarket paint variations of purchased Cybertrucks® now exist, at the time of SDXL training, the only color shown was the signature silver metallic finish. Our method realistically imagines how this vehicle would look with different paint colors that are unlikely to have been in the training dataset. This provides strong evidence that our method would work well with a diffusion model trained with a dataset comprising only non-copyrighted stock photography (e.g., Adobe Firefly®). Although SDXL is a popular base model, we present a more modern method, FLUX, released in August 2024. FLUX is known for its photorealism, but without guidance or fine-tuning, it can produce unrecognizable representations, such as the improbable vehicle of FIG. 16A. FIG. 16B demonstrates the effectiveness of our fine-tuning pipeline for this diffusion model. While the ecosystem for control adapters is not yet mature enough to fully explore our quality and branding assurance pipeline, we believe FLUX will still benefit significantly from this treatment.

Image Guidance

Figure 17B:
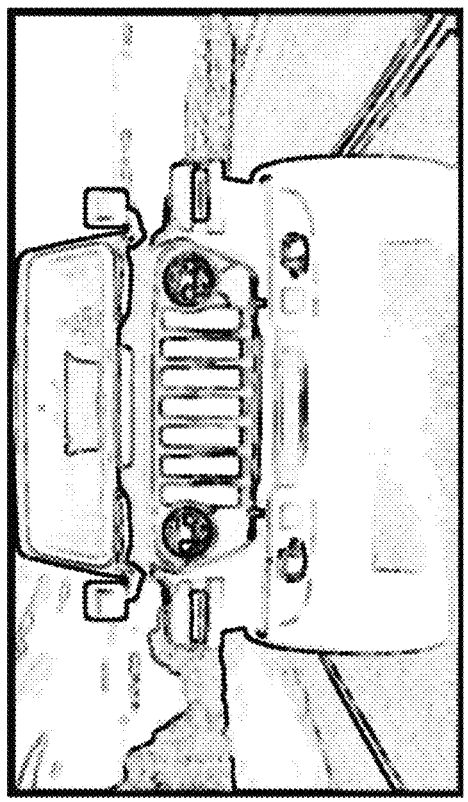
FIG. 17B illustrates the original vehicle after image analysis.
Figure 17D:
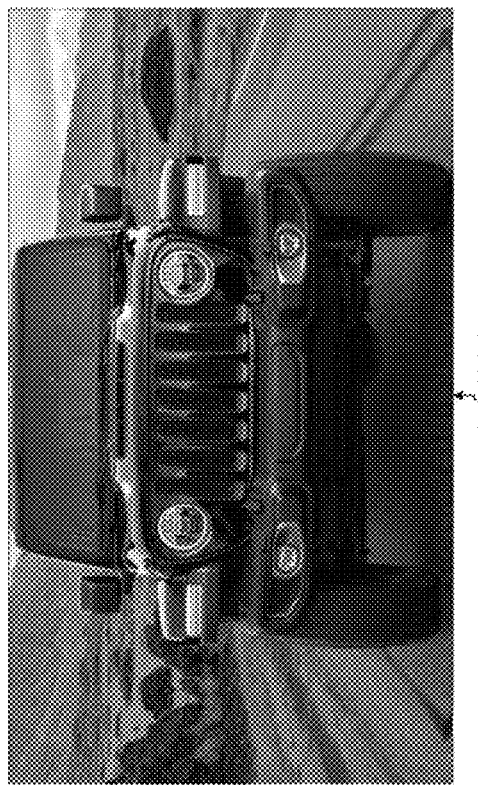
FIG. 17D illustrates the original vehicle as a variant image.
Figure 17A:
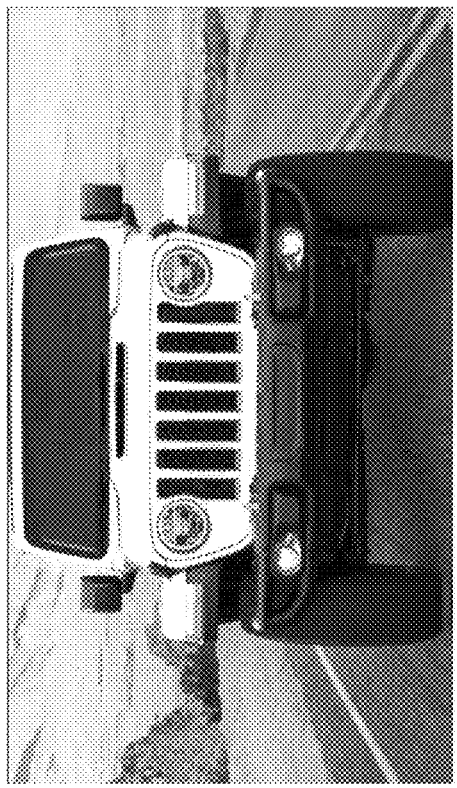
FIG. 17A illustrates an original vehicle.
Figure 17C:
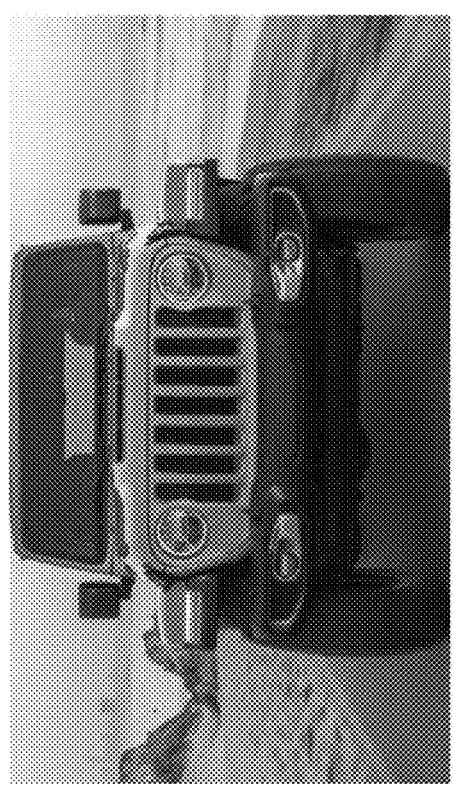
FIG. 17C illustrates the original vehicle as a variant image.

While the previous section showed that entirely novel settings can be generated for new concepts, we demonstrate here how ControlNet-style guidance can provide more precise control over a scene composition. FIG. 17A shows an initial image. FIG. 17B shows the initial image analyzed for edge detector output. This allows the setting and vehicle shade to change, as shown in FIG. 17C and FIG. 17D. A large and growing number of ControlNets exist, but we show one based on maintaining the dominant edges in the original image in FIG. 17B. Some of the rock structures (in addition to the vehicle pose) are maintained but adapted to the appropriate setting, which is provided via a text prompt (e.g., including the word "beach"). The strength of this control is variable, allowing the compositional elements to be imposed. In this example, we use the same fine-tuning LoRA along with prompt-based location guidance, canny edge ControlNet guidance, and an image-to-image diffusion pipeline (where that image may optionally be replaced with an encoded embedding).

This example demonstrates how more creative control can be applied to the process. We can use a single existing ad and adapt it to new locations personalized to a setting more relevant to the consumer. This method complements existing marketing teams while ensuring a precise and high-quality representation of the branded subject.

Implementation, Pre-Processing and Post-Processing

The goal of our processing pipeline is to maximize the ability to learn a precise representation of a new subject (e.g., a new model of car, new location) allowing high-quality images to be generated with variations not necessarily in the training set (e.g., settings or color variations). Most fine-tuning methods that support this goal have two requirements: (1) a labeled prepared dataset and (2) a method to refer to the new object for inference. For the dataset requirement, the label consists of a caption in natural language that describes each picture. For example, for FIG. 14B, the caption might read "A black SUV driving off-road in rocky terrain in sunny weather." While labeling a dataset was previously an expensive, painstaking effort, modern large language models can automatically caption datasets with high accuracy. The photos in the dataset should feature the subject clearly and prominently. The framing should avoid extreme zooming; a photo with too wide a zoom will have very few pixels devoted to the subject, making it difficult to identify, while a photo with too close a zoom will not provide information on the background, making it difficult to learn how the subject interacts with the environment (e.g., reflections).

Modern segmentation methods (including panoptic segmentation and LLM-based segmentation methods) and ML-based up samplers allow significantly more natural imagery to be used, including those that violate the above guidelines. While these machine learning tools are excellent for these tasks, an immediate dilemma arises: how can pre-trained tools identify, caption, and isolate imagery of a subject when that subject may not have been seen (or existed) when the models were trained? One solution is to use natural language embeddings to find the keyword known to the diffusion LLM that is closest to the subject in all captions, using the similarity features of word (or sentence) embeddings. For example, a new vehicle unknown to an ML captioner may simply be labeled a "car," "truck," or "SUV." We may augment this with hints provided by the advertiser at training time and/or query a more modern captioner model for the salient subject based on the image composition alone. Once that keyword is known, we can modify the captions to insert a trigger token for training purposes, supporting the second requirement: how to refer to the new subject for future inference. While the processing above is often essential for basic fine-tuning, we will also discuss the segmentation of branding and low perceptual quality areas for our quality assurance processing. As previously noted, quality assurance processing is not exclusive to pre-processing for fine-tuning; it may also be used in post-processing after inference. We will address the same dilemma of identifying branding and assessing the quality of a subject and associated branding that may not have been seen by any of these pre-trained models before. Taken as a whole, this preprocessing provides a high-quality and scalable fine-tuning solution that requires minimal (or no) human input for a wide variety of advertising subjects.

Captioning

Captioning an image involves describing its contents—a task that is straightforward but slow for humans and, until recently, difficult for ML models to do accurately and consistently. The Bootstrapping Language-Image Pre-training (BLIP) model is effective at captioning for SDXL fine-tuning. BLIP bridges the gap between natural language processing and computer vision. We demonstrate the use of more modern methods, noting that many alternatives exist, and aim to closely match the underlying language models used for prompt processing at diffusion inference time, where possible. In addition to improved captioning quality, newer BLIP variants also support question answering, which can help identify salient subjects.

Key Word Detection

The goal of keyword detection is to identify a single word (or phrase or embedding) that best describes the subject we are learning. Once identified, this keyword can be used to modify the image captions in the training dataset (a necessary step for some fine-tuning methods) and for segmentation methods for the images, both of which support effective fine-tuning of the overall diffusion model. One approach used in our pipeline for this purpose is natural language word (or sentence) embeddings. Methods such as FLAIR-NLP convert a word to a numerical vector, allowing for mathematical operations to be applied to natural language words, including determining the degree of similarity. For example, in a collection of images of vehicles, the word "SUV" or "vehicle" may often be the most related to the set of all words obtained from all captions. As most vehicle pictures have tires touching a surface, the keyword "road" may match with some strength, as it may include paved roads and dirt roads, but it will often have a lower similarity score for a diverse set of images that show the vehicle parked in nature or in a driveway and thus do not have strong "road" content. Given a diverse set of imagery, keyword detection will often successfully identify the subject of interest in a photo, even if the subject was not common (or even did not exist) at the time the captioning model was trained. To improve results, we allow the advertiser at training time to provide a set of hints, in which case the candidates will be chosen from those hints rather than all words from all captions even if it does not exist in any single caption. In this case, even a weak hint will suffice; for example, if all captions use the word "SUV," the hint "vehicle" or "truck" will also match strongly. A second method to improve performance is to optionally leverage the captioning models for salient subject detection. In this case, we simply query the captioner for the salient subject in the picture. When doing this, we may use human-provided hints (also optional) as context in that query. This way, layers of refinement and manual control can optionally improve keyword detection performance, but the method can work with no human input at all, either for hints or captioning.

Trigger Token Processing

While one strategy for model fine-tuning is to intentionally overfit a subject that is already known (e.g., overfit the word "SUV" for a "Cybertruck" subject that has not been seen by the LLM in the diffusion model before), an alternative method is to provide a new trigger word or token that carries no (or weak) prior semantic meaning to the LLM. This allows the new subject to be referenced at inference time. While the exact trigger token is not important, a common practice is to use the word "TOK" (a variation on "token"), as will appear in some of our example figures.

Given a previously computed caption and keyword, we may use the same language embedding methods used for keyword detection to identify the word in each caption that most associates with the new subject. At that point, we can insert the trigger token so that the new caption includes the new concept. For example, we could replace the caption "a red vehicle off-road" with "a red TOK vehicle off-road." It is important to note that nuances with prompt engineering exist when emphasizing parts of a word, but the basic idea remains the same. In this way, the second processing requirement of a method to refer to the new subject for inference is now possible; to continue the example, we may subsequently request "A blue TOK vehicle on a highway."

Segmentation

Figure 18C:
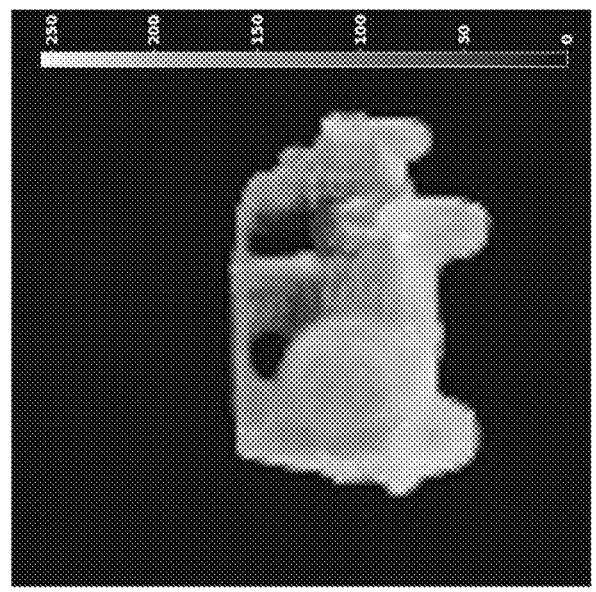
FIG. 18C illustrates a mask indicating the probability of matches for a panoptic truck class with brighter shades representing stronger probabilities.
Figure 18B:
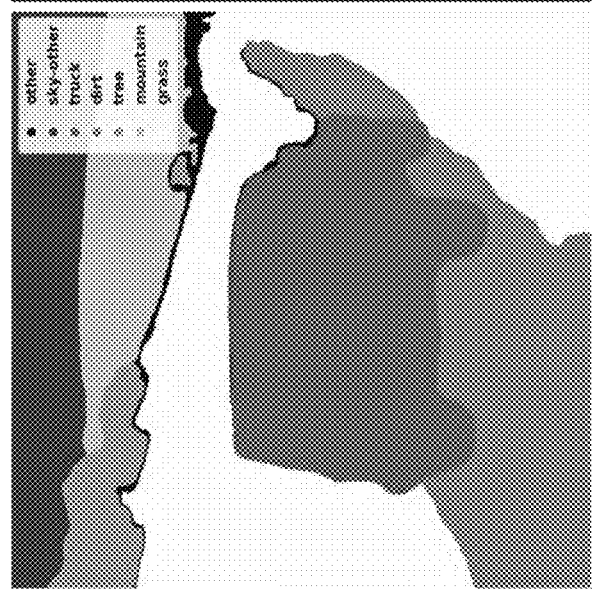
FIG. 18B illustrates a class map of the vehicle input image where each shade represents a different identified class as characterized in a displayed legend.

In support of re-cropping an image for diffusion fine-tuning and other quality-assurance methods, identifying the location of the subject of interest in the image is highly useful. This task, known as segmentation, involves identifying the region (pixels) that pertain to the new subject. Various modern methods support this, including the CLIPSeg model, which uses NLP models to highlight pixels according to a natural language prompt. CLIPSeg segments images using supplied text prompts or prototype images. However, we find panoptic segmentation methods to be more effective for advertising purposes as they better select the edges of the subject and can handle multiple instances of a subject. As before, the challenge of identifying a new subject not known to the pre-trained segmentation model applies to this step as well. While these segmentation methods can be fine-tuned for a specific industry or product category, we may also use our detected keyword to match against the list of classes known to the panoptic segmentation model (e.g., "car"). The layer that pertains to the instances of the desired class will comprise a segmentation map, which is a contiguous region encompassing the subject of interest, and a probabilistic segmentation mask, which relates to the probability of the prediction of each class for each pixel. An example of the segmentation map and mask is shown in FIG. 18B and FIG. 18C, respectively.

Cropping

Figure 19:
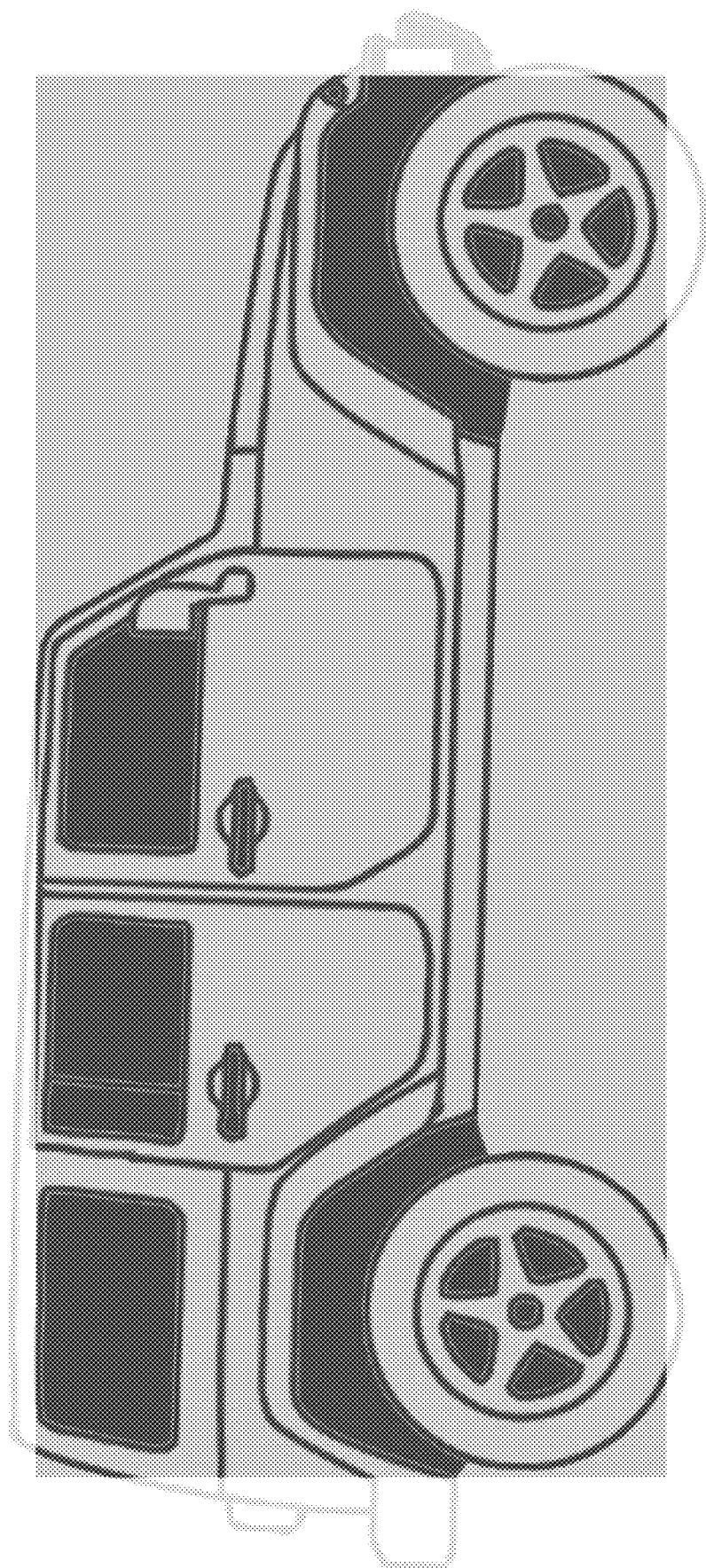
FIG. 19 shows the scoring functionality where the individual score is derived by balances avoiding both non-subject space (areas outside of the vehicle but inside the rectangular crop box) and omission of subject edges (areas inside the vehicle but outside the rectangular crop box).
Figure 20A:
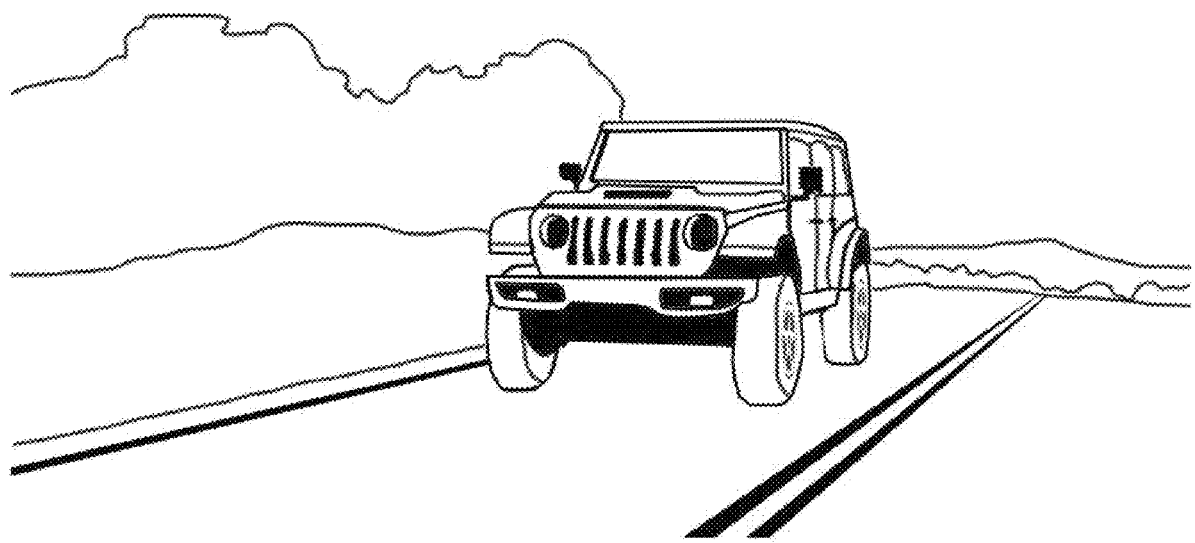
FIG. 20A illustrates a vehicle input image.
Figure 20B:
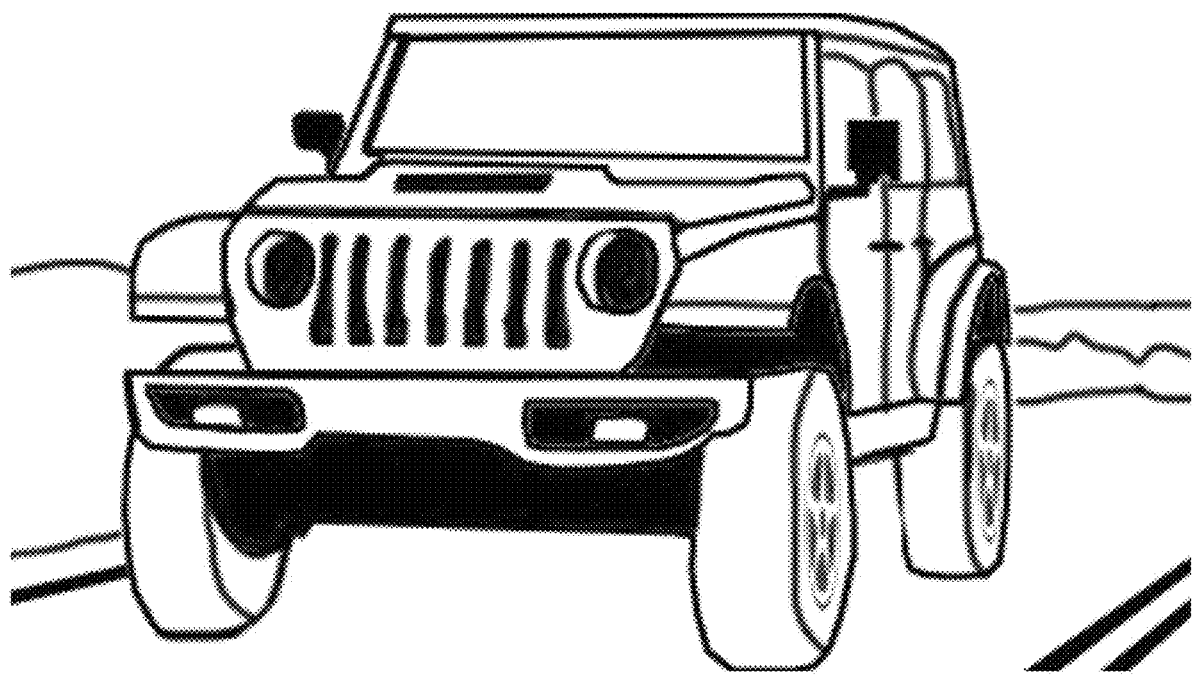
FIG. 20B illustrates the vehicle input image after automatic cropping and up sampling.

A challenge in diffusion image generation is that the desired aspect ratio of the final ad space may not align well with the subject matter. For example, a vehicle, which is typically better suited for a landscape aspect ratio, may not fit well in a narrow portrait aspect ratio required for a side banner ad. Additionally, many diffusion methods, such as SDXL, have preferred aspect ratios and associated resolutions. To address this, our pipeline uses a two-step process. First, for a given aspect ratio, the optimal cropping is determined by balancing the objectives of filling the frame with subject pixels while ensuring the entire object is within the frame. The weight of each objective is adjustable, allowing for the inclusion of background content for context. The second step involves determining the best aspect ratio by evaluating all candidate aspect ratios for the optimal objective metric. This optimization can be performed for a single image or across the entire training set to produce the best overall aspect ratio. An example of a candidate aspect ratio and cropping is shown in FIG. 19. We may also choose to apply the best crop for all images within each preferred aspect ratio bucket to enhance inference flexibility. When used dynamically, this feature can serve as a data augmentation method. A final step in cropping involves using an ML-based up sampler, as shown in FIG. 20B, such as the swin2sr model, to up sample the final cropping. The swin2sr model is an AI model for photorealistic image super-resolution and restoration. While starting with high-resolution imagery can eliminate the need for this step, post-crop up sampling is useful for quality assurance.

Branding Extraction

While a previously created branding standard, comprising a set of examples of appropriate uses of the branding element, may be provided for branding purposes, our pipeline is designed to extract this automatically from natural imagery if desired. The method should work with previously unseen branding to be most effective. For this step, CLIPSeg may be effective as it can capture more generic conceptual phrases, such as "text, logos, branding," but panoptic segmentation appropriately fine-tuned for branding is also suitable. It is important to isolate the subject of interest from the background (using the previously mentioned segmentation), as background text is not desired in the resulting dataset. Since CLIPSeg typically produces much noisier boundaries than panoptic segmentation, we must refine the image with various adaptive contrast enhancers and robust adaptive denoisers. Once the boundaries have been refined, we may then crop at a specific aspect ratio (e.g., square) with a variable amount of padding. These final cropped images may be resampled to an appropriate resolution and then stored as a standard. There are several possibilities for using these images, including with LoRA adaptation, IP adapters, or ControlNets, so this data may be further reduced to another model (e.g., LoRA weights) or embeddings. While the steps above show the utility for extracting branding from the training data, we may also employ this same pipeline (with appropriate hyperparameters) at inference time to identify branding that needs to be corrected.

A complementary task to branding extraction is non-branding extraction. In this step, areas of branding are specifically avoided. When inpainting with methods such as IP Adapters, patches from the non-branded parts of the image serve in place of a human-language prompt and are better used to provide the context needed to ensure inpainting consistency with the remainder of the imagery. While the segmentation maps may be used for this, optimal placement of crop boxes is a non-trivial problem. We demonstrate a greedy distance metric-based method that minimizes overlap with non-maximum suppression. The resulting imagery is the complement to the branding and may similarly be further processed for use at inference time. Example results of branding extraction are shown in FIG. 21A and non-branding extraction in FIG. 21B.

Quality Assessment

For quality assessment, we have explored various methods of ML-based perceptual quality assessment. These methods predict perceptual quality as determined by a human, and the more popular methods have been validated by comparing them to human output. Some examples include Q-Align and Multi-Scale Image Quality Transformer (MUSIQ). Q-Align is a framework to align AI systems with human values and ethical considerations. MUSIQ is a machine learning model designed to evaluate the visual quality of images. MUSIQ, provide a patch-level score internally and aggregate that result to an overall scalar score. These methods can be modified to remove the final aggregation step, allowing for a pixel-level estimate of quality. For other methods, such as Q-Align, we may use an overlapping tile method, which is common in many image detection methods. The final estimate is then interpolated to produce a quality map. These regions may identify areas that need inpainting. Even if hard decisions are made on regions to inpaint, the mask can be feathered, and hyperparameters on the inpainting process can mitigate the need for perfect quality-based segmentation. The process for quality assurance is discussed in detail in the Section titled "QUALITY AND BRANDING ASSURANCE".

Quality and Branding Assurance

In this section, we demonstrate two forms of quality assurance: perceptual image quality and branding assurance. Various methods are discussed, offering flexibility depending on the specific application or needs.

Brand Protection

In this method, personalized advertisements would be generated without human intervention on the advertising brand. To avoid undesired (e.g., politically sensitive) scenes (e.g., a political protest), then automated object/captioning may be used to detect these elements and prevent the image from being used further. In this instance a new seed may be used to generate an alternative image until an acceptable image passes. As opposed to content moderation, in which false positives could, say, suppress free speech, setting a very low threshold for false negatives carries little cost (other than computation) as a new scene can be generated automatically.

Additionally, the brand may desire to promote more diversity (location, ideology, nationality, etc.) for all ads regardless of any homogeneity in the images of the consumer by simply adding additional keywords to the inference image generation.

Quality Assurance

Figure 18A:
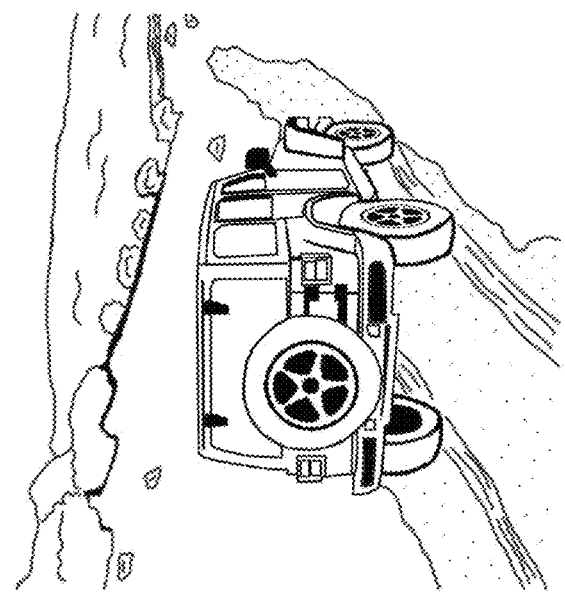
FIG. 18A illustrates a vehicle input image.

Leveraging the earlier work in panoptic segmentation and perceptual quality prediction and combining with differential diffusion allows parts of the image with insufficient perceptual quality to be improved. The improvement may be limited to specific parts (or even latent space pixels) of the image with controllable degrees of modification. By dynamically determining a mask for the subject (e.g., vehicle as in FIG. 18A), feathering the edges of the transition region, and then combining with the per-pixel grayscale perceptual quality map (as in FIG. 22C), we may selectively improve the image while maintaining the fidelity of the original subject. The approach is compatible with a variety of perceptual quality estimators, segmentation methods, diffusion base models, noise schedulers, and even fine-tuning. Additionally, perceptual quality estimation may itself be fine-tuned to a specific application (e.g., for a particular aesthetic) or may be fine-tuned to the subject itself separately to ensure that it is also faithfully rendered. In cases closer to binary classification, we may alternatively choose to simply replace the entire subject if insufficient quality is detected. Finally, as the text prompt still influences the output, specific items in the background which may include other text, inappropriate subject matter, etc., may be removed via a negative prompt when identified (e.g., with a classifier); this assures quality in the sense of usefulness and appropriateness to the intended audience. As mentioned, the subject itself may also be improved, but the intent of the graphic is to show that unlike many other diffusion methods (e.g., image-to-image), we maintain the fidelity of the specialized subject even without fine-tuning in the quality assurance pass.

Branding Assurance

In this section, we demonstrate the ability to ensure branding is appropriately rendered, given that standard diffusion methods often fail to accurately render text. Rather than focusing on perceptual quality, we may instead identify branding. Using a similar differential diffusion approach, we can ensure branding is faithfully rendered. This may optionally include fine-tuning quality assessment methods or classifiers and may also include additional forms of guidance, such as IP Adapters from a diverse set of branding standard images (either provided or automatically derived), or more direct ControlNet-style guidance. We discussed the use of this guidance when modifying an advertising template, but we may also use the branding standard (the closest appropriate match) by performing feature matching and an appropriate computer vision transformation to better match the generated image geometry and perspective. FIG. 24A shows a generated image. FIG. 24B shows the image after brand quality assurance is applied.

Server-Side (Off Device) Variation

While this method is fully compatible with end-device privacy protection, the personalization, training, and edge inference may also occur server side or vice versa and even a hybrid scenario where some compute can be performed on the server while others can be done client side, especially in the scenario where privacy is a concern. In this case (where personal imagery is not available) browsing history may be used to infer a personalized scene prompt.

Where methods described above indicate certain events occurring in certain order, the ordering of certain events may be modified. Additionally, certain of the events may be performed concurrently in a parallel process when possible, as well as performed sequentially as described above. Accordingly, the specification is intended to embrace all such modifications and variations of the disclosed embodiments that fall within the spirit and scope of the appended claims.

CONCLUSION

We presented a flexible and powerful method to simultaneously provide personalization and privacy while complementing existing advertising infrastructure, whether edge-based or centralized. By leveraging metadata of any resolution or type, we can guide personalization while allowing the platform and/or end-user to control the degree of personalization and the option to keep all personal data on the end device. We demonstrated that, when properly prepared, natural imagery is sufficient for high-quality capture via performance-efficient fine-tuning, and that fine-tuned control is possible through various forms of guidance or templating. Modern machine learning, including natural language processing, segmentation methods, and perceptual quality estimators, can complement the end-to-end pipeline for both fine-tuning (training) and image generation (inference). We provided several examples to ensure the fidelity of the advertised subject, especially the branding, along with the overall perceptual quality of the background and its interaction with the subject, where standard diffusion typically fails. Although the focus was on static imagery, we believe (based on our prior research in generative AI-based video compression that these same techniques will apply to video. While our work was demonstrated on general-purpose GPUs, these methods can be performed in non-real time with background compute availability. Although some current lower-end hardware may be incapable of this processing, we note that the efficiency of diffusion algorithms (software) is growing exponentially. Additionally, specialized silicon (hardware) for generative AI has recently appeared. The first to market, the Sohu®, is an ASIC that supports the transformer architecture, used not only in GPT-like NLP but also in popular image/video diffusion and modern segmentation methods (as evidenced by the Oasis project). Solutions like these may soon appear in a mobilefriendly system-on-a-chip (SoC), allowing the inference pipeline to operate efficiently on a mobile device or streaming system.

The foregoing description, for purposes of explanation, used specific nomenclature to provide a thorough understanding of the claimed systems and methods. However, it will be apparent to one skilled in the art that specific details are not required in order to practice the systems and methods described herein. Thus, the foregoing descriptions of specific embodiments of the described systems and methods are presented for purposes of illustration and description. They are not intended to be exhaustive or to limit the claims to the precise forms disclosed; obviously, many modifications and variations are possible in view of the above teachings. The embodiments were chosen and described to best explain the principles of the described systems and methods and their practical applications, they thereby enable others skilled in the art to best utilize the described systems and methods and various embodiments with various modifications as are suited to the particular use contemplated. It is intended that the following claims and their equivalents define the scope of the systems and methods described herein.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A system, comprising:
a server to train an artificial intelligence model on training data characterizing a good or service to form a trained model;
a client device associated with a user, the client device executing instructions on a processor to:
receive the trained model via a network connection to the server;
collect user data;
dynamically generate a personalized digital image advertisement from the trained model and user data, where the personalized digital image advertisement includes a synthetic digital image formed by a trained machine learning model;
transform the personalized digital image advertisement with fine-grained image control modifications, quality assurance operations using differential diffusion so that parts of the personalized digital image advertisement with insufficient perceptual quality are improved, and branding assurance operations using differential diffusion to ensure branding is faithfully rendered to form a final personalized digital image advertisement; and
present the final personalized digital image advertisement on the client device.

2. The system of claim 1 wherein the training data is derived from automated captioning machine learning models.

3. The system of claim 1 wherein the final personalized digital image advertisement is derived from automated segmentation models.

4. The system of claim 1 wherein the final personalized digital image advertisement is derived from automated branding segmentation models.

5. The system of claim 1 wherein the user data is natural language text that is processed by a large language model to convert the natural language text to an embedding processed by the trained model.

6. The system of claim 1 wherein the user data is quantitative data that is converted to an embedding processed by the trained model.

7. The system of claim 1 wherein the user data is multimedia data that is converted to a textual representation that is processed by a large language model to convert the textual representation to an embedding processed by the trained model.

8. The system of claim 1 wherein the fine-grained image control modifications utilize image prompt adapters.

9. The system of claim 1 wherein the fine-grained image control modifications utilize a neural network that allows for fine-tuning of a pre-trained diffusion model.

10. The system of claim 1 wherein the fine-grained image control modifications include inpainting within the personalized digital image advertisement.

11. The system of claim 1 wherein the quality assurance operations refine the personalized digital image advertisement using differential diffusion.

12. The system of claim 1 wherein the quality assurance operations refine the personalized digital image advertisement using a perceptual quality predictor.

13. The system of claim 1 wherein the quality assurance operations refine the personalized digital image advertisement using an undesirable content detector.

14. The system of claim 1 wherein the quality assurance operations refine the personalized digital image advertisement using a text detector model.

15. The system of claim 1 wherein the quality assurance operations refine the personalized digital image advertisement using an image detector configured to detect product inaccuracies.

16. The system of claim 1 wherein the quality assurance operations refine the personalized digital image advertisement using an image detector configured to detect aesthetic mismatch.

17. The system of claim 1 wherein the branding assurance operations refine the personalized digital image advertisement using differential diffusion.

18. The system of claim 1 wherein the branding assurance operations refine the personalized image advertisement using image prompt adapters.

19. The system of claim 1 wherein the branding assurance operations identify a region within the personalized image advertisement using a natural language processing image segmentation model.

20. The system of claim 1 wherein the branding assurance operations identify a region within the personalized image advertisement using advertiser branding guidelines.

* * * * *